US011674443B2

(12) United States Patent
McCurdy Gibson et al.

(10) Patent No.: US 11,674,443 B2
(45) Date of Patent: Jun. 13, 2023

(54) HYDROGEN FUEL SYSTEM

(71) Applicants: General Electric Company, Schenectady, NY (US); GE Avio S.r.l., Turin (IT)

(72) Inventors: Nathan Evan McCurdy Gibson, West Chester, OH (US); David Justin Brady, Rockport, MA (US); Justin Paul Smith, Montgomery, OH (US); Mirko Gernone, Noicattaro (IT)

(73) Assignees: General Electric Company, Schenectady, NY (US); GE Avio S.r.l., Turin (IT)

( * ) Notice: Subject to any disclaimer, the term of this patent is extended or adjusted under 35 U.S.C. 154(b) by 0 days.

(21) Appl. No.: 17/474,156

(22) Filed: Sep. 14, 2021

(65) Prior Publication Data
US 2022/0145801 A1    May 12, 2022

(30) Foreign Application Priority Data
Nov. 6, 2020    (IT) .................. 102020000026590

(51) Int. Cl.
*F02C 7/224*    (2006.01)
*F02C 3/22*    (2006.01)
(52) U.S. Cl.
CPC ............... *F02C 7/224* (2013.01); *F02C 3/22* (2013.01); *F05D 2220/323* (2013.01); *F05D 2240/36* (2013.01); *F05D 2260/20* (2013.01)
(58) Field of Classification Search
CPC ........ F02C 7/224; F02C 3/22; F05D 2240/36; F05D 2220/323; F05D 2260/20
See application file for complete search history.

(56) References Cited

U.S. PATENT DOCUMENTS

| 9,239,013 B2 * | 1/2016 | Zhang ..................... F02C 7/232 |
| 2014/0183957 A1 * | 7/2014 | Duchesneau ......... F01K 13/006 |
| | | 307/64 |
| 2015/0337730 A1 | 11/2015 | Kupiszewski et al. |

(Continued)

FOREIGN PATENT DOCUMENTS

| CN | 104948303 A | 9/2015 |
| WO | WO2012/173651 A1 | 12/2012 |

OTHER PUBLICATIONS

The Wayback Machine—https://web.archive.org/web/20190413122532/https://www.engineeringtoolbox.com/hydrogen-d_1419.html, 2019, the engineering ToolBox.*

(Continued)

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A fuel system for a vehicle having an engine is provided. The fuel system including: a fuel tank for holding a hydrogen fuel in a liquid phase; a fuel delivery assembly extending from the fuel tank to the engine for providing the hydrogen fuel from the fuel tank to the engine; a vaporizer in communication with the fuel delivery assembly for heating the hydrogen fuel in the liquid phase to a gaseous phase, to a supercritical phase, or both; and a high pressure pump in fluid communication with the fuel delivery assembly at a location downstream of the vaporizer for inducing a flow of the hydrogen fuel through the fuel delivery assembly to the engine.

20 Claims, 13 Drawing Sheets

(56) References Cited

U.S. PATENT DOCUMENTS

| | | |
|---|---|---|
| 2016/0025339 A1 | 1/2016 | Kamath et al. |
| 2016/0123226 A1 | 5/2016 | Razak et al. |
| 2018/0351421 A1* | 12/2018 | Muramatsu ............ H02K 5/203 |
| 2020/0088099 A1* | 3/2020 | Roberge .................... F02C 7/16 |
| 2021/0340908 A1* | 11/2021 | Boucher ................. F02C 7/224 |

OTHER PUBLICATIONS

Fehrm, Bjorn's Corner: The Challenges of Hydrogen. Part 29. Gas Turbine Heat Management, Leeham News and Analysis, Mar. 19, 2021, 5 Pages. https://leehamnews.com/2021/03/19/bjorns-corner-the-challenges-of-hydrogen-part-29-gas-turbine-heat-management/.

* cited by examiner

HYDROGEN FUEL SYSTEM

PRIORITY INFORMATION

The present application claims priority to Italian Patent Application Number 102020000026590 filed on Nov. 6, 2020.

FIELD

The present subject matter relates generally to hydrogen fuel system for a vehicle, such as a hydrogen fuel system for an aeronautical vehicle.

BACKGROUND

A conventional commercial aircraft generally includes a fuselage, a pair of wings, and a propulsion system that provides thrust. The propulsion system typically includes one or more aircraft engines, such as turbofan jet engines. The turbofan jet engine(s) may be typically mounted to a respective one of the wings of the aircraft, such as in a suspended position beneath the wing, mounted to the wing using a pylon.

The aircraft includes a fuel delivery assembly that generally includes a fuel tank and one or more fuel lines that extend between the fuel tank and the aircraft engines. Traditional aircraft engines are powered by aviation turbine fuel, which is typically a combustible hydrocarbon liquid fuel, such as a Kerosene-type fuel, having a desired carbon number. The aviation turbine fuel is a relatively power-dense fuel that is relatively easy to transport and stays in a liquid phase through most ambient operating conditions for aircraft.

It has been argued that improvements in emissions from conventional aircraft having aircraft engines powered by aviation turbine fuel may be achieved by utilizing a hydrogen fuel. Hydrogen fuel is not a relatively power-dense fuel in its gaseous form and defines a relatively low boiling point and a relatively low freezing point. Hydrogen fuel further tends to seep through materials when in gaseous form.

The inventors of the present disclosure have found that these and other issues may make it difficult to effectively use hydrogen fuel for aircraft engines. Accordingly, technological improvements facilitating use of hydrogen fuel in aircraft engines in view of these and other issues would be welcomed.

BRIEF DESCRIPTION

Aspects and advantages of the invention will be set forth in part in the following description, or may be obvious from the description, or may be learned through practice of the invention.

In one exemplary embodiment of the present disclosure, a fuel system for a vehicle having an engine is provided. The fuel system including: a fuel tank for holding a hydrogen fuel in a liquid phase; a fuel delivery assembly extending from the fuel tank to the engine for providing the hydrogen fuel from the fuel tank to the engine; a vaporizer in communication with the fuel delivery assembly for heating the hydrogen fuel in the liquid phase to a gaseous phase, to a supercritical phase, or both; and a high pressure pump in fluid communication with the fuel delivery assembly at a location downstream of the vaporizer for inducing a flow of the hydrogen fuel through the fuel delivery assembly to the engine.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
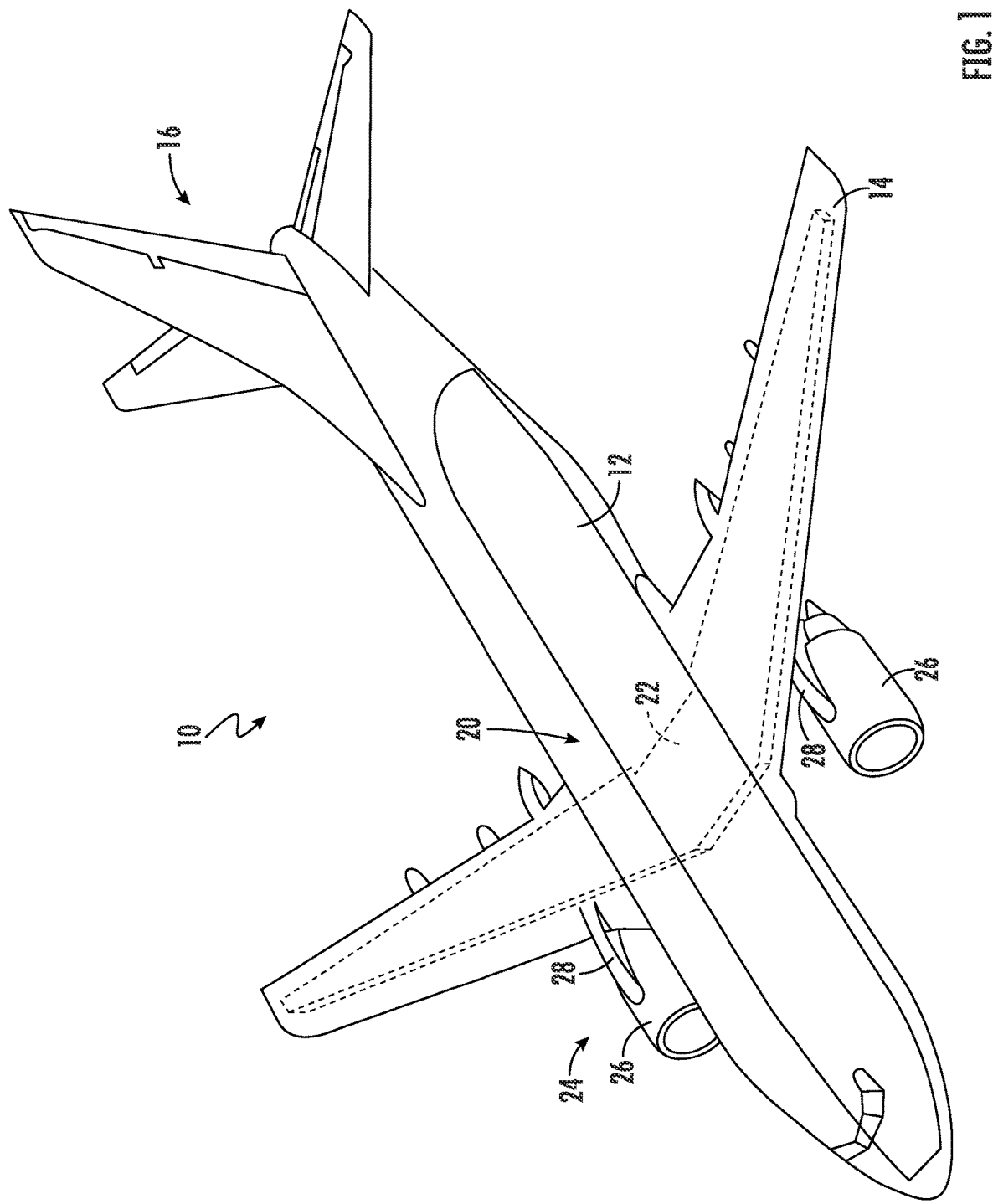
FIG. 1 is a schematic view of an aircraft having a fuel system in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Vaporizer Upstream of HP Pump in Hydrogen Fuel System:

In certain exemplary aspects, a fuel system for a vehicle having an engine is provided. The engine is a hydrogen engine, and the fuel system is configured to provide hydrogen fuel to the engine. The fuel system generally includes a fuel tank for holding the hydrogen fuel in a liquid phase (e.g., at least partially within a liquid phase or substantially completely within a liquid phase), a fuel delivery assembly extending from the fuel tank to the engine for providing the hydrogen fuel from the fuel tank to the engine, a vaporizer in communication with the fuel delivery assembly for heating the hydrogen fuel in the liquid phase to a gaseous phase, to a supercritical phase, or both, and a high pressure pump in fluid communication with the fuel delivery assembly at a location downstream of the vaporizer for inducing a flow of the hydrogen fuel through the fuel delivery assembly to the engine.

The vaporizer is positioned upstream of the high pressure pump to facilitate certain functions of the vaporizer, to provide a more compact configuration, etc. For example, the vaporizer may be position proximate the fuel tank, such as within the same structure as the fuel tank (e.g., in the wing of the aircraft with the fuel tank). The vaporizer may be capable of heating at least a portion of liquid hydrogen fuel to a gaseous phase during, e.g., a pre-start operating condition of the engine as part of a priming operation for the fuel system. In particular, the vaporizer may provide the heated/gaseous hydrogen fuel to the fuel delivery assembly during this pre-start operating condition such that when hydrogen fuel is subsequently provided through the fuel delivery assembly to the engine for combustion, such a flow of hydrogen fuel does not freeze the fluid within the fuel delivery assembly.

Priming Air Through a Hydrogen Fuel System

Additionally, in certain exemplary aspects, a method of operating a fuel system for a vehicle having an engine is provided whereby a primer fluid is provided through portions of the fuel system prior to starting the engine freezing an initial fluid within said portions of the fuel system. The method may include priming a fuel delivery assembly of the fuel system with a primer fluid defining a primer fluid phase change point, and providing a flow of a hydrogen fuel from a fuel tank of the fuel system to the engine through the fuel delivery assembly. The hydrogen fuel within the fuel tank may be at least partially in a liquid phase. With such an exemplary aspect, providing the flow of the hydrogen fuel from the fuel tank may include providing the flow of the hydrogen fuel from the fuel tank at a temperature equal to or above the primer fluid phase change point of the primer fluid.

In certain exemplary aspects, the primer fluid may be a fluid having a lower freezing point then the hydrogen fuel, such as helium. In other aspects, priming the fuel delivery assembly may include providing a pre-primer fluid having a freezing point (or boiling point) higher than the hydrogen fuel, and following-up with the primer fluid, which may be heated hydrogen fuel. More specifically, with such an aspect the primer fluid may be hydrogen fuel heated from a liquid phase to a gaseous phase through, e.g., a primer vaporizer.

Such an exemplary aspect may ensure that providing hydrogen fuel flow through the fuel delivery assembly to operate the engine does not freeze any fluid remaining in the fuel delivery assembly.

Purging Air Through Hydrogen Fuel System

Additionally, in certain exemplary aspects, a method of operating a fuel system for a vehicle having engine is provided, whereby the remaining volume of hydrogen fuel in the fuel system is purged following a shutdown of the engine. The method may include providing a flow of a hydrogen fuel from a fuel tank of the fuel system to the engine through the fuel delivery assembly during operation of the engine; terminating the flow of hydrogen fuel from the fuel tank to the engine through the fuel delivery assembly; and evacuating a remaining volume of hydrogen fuel from the fuel delivery assembly.

In certain exemplary aspects, evacuating the remaining volume of hydrogen fuel from the fuel delivery assembly may include providing a purge fluid through the fuel delivery assembly following shutdown of the engine. The purge fluid may define a freezing temperature less than a freezing temperature of the hydrogen fuel, in which case the purge fluid may be provided immediately following the shutdown of the engine. Alternatively, the purge fluid may define a freezing temperature greater than a freezing temperature of the hydrogen fuel, in which case the purge fluid may be provided after a boiling off period following shutdown of the engine.

Additionally, in certain exemplary aspects, evacuating the remaining volume of the hydrogen fuel may include one or more of burning off at least some of the remaining portion of the hydrogen fuel, venting to atmosphere at least some of the remaining portion of the hydrogen fuel, recapturing at least some of the remaining portion of the hydrogen fuel, etc.

By evacuating the remaining portion of the hydrogen fuel from the fuel delivery assembly of the fuel system following a shutdown of the engine, there may be less of a risk of the hydrogen fuel seeping through the fuel delivery assembly and, e.g., accumulating an undesirable location.

Hydrogen Fuel system with Multiple Vaporizers

In addition, in certain exemplary aspects, hydrogen fuel system for a vehicle is provided, whereby the fuel system includes at least two separate vaporizers for heating the hydrogen fuel during at least two different operating conditions of the engine, to ensure the hydrogen fuel may be provided to the engine across desired operating ranges in with the desired overall efficiency. For example, the exemplary fuel system may include a first vaporizer in communication with a fuel delivery assembly for heating the hydrogen fuel in the liquid phase 2 a gaseous phase, to a supercritical phase, or both, when the engine is in a first operating condition. The fuel system may also include a second vaporizer in communication with the fuel delivery assembly for heating the hydrogen fuel in the liquid phase to a gaseous phase, to a supercritical phase, or both, when the engine is in a second operating condition.

For example, the first operating condition may be an engine operating condition whereby the engine is not yet in a thermally stable mode. With such an exemplary aspect, the first vaporizer may be configured to receive heat from heat source external to the engine, such that the first vaporizer is not dependent on receiving heat from the engine. The second operating condition, by contrast, may be an engine operating condition whereby the engine has reached a thermally stable mode. In such an exemplary aspect, the second vaporizer may be configured to receive heat from the engine, such that the second vaporizer may operate efficiently by utilizing, e.g., waste heat from the engine.

Figures

Referring now to FIG. 1, a perspective view of a vehicle of the present disclosure is provided. Specifically, for the exemplary embodiment of FIG. 1, the vehicle is configured as an aeronautical vehicle, or aircraft 10. The exemplary aircraft 10 has a fuselage 12, wings 14 attached to the fuselage 12, and an empennage 16.

The exemplary aircraft 10 further includes a fuel system 20 having a fuel tank 22. In the exemplary aircraft 10 shown in FIG. 1, at least a portion of the fuel tank 22 is located in a wing 14 of the aircraft 10. In some embodiments, however, the fuel tank 22 may be located at other suitable locations in the fuselage 12 or the wing 14.

The aircraft 10 further includes a propulsion system 24 that produces a propulsive thrust required to propel the aircraft 10 in flight, during taxiing operations, etc. Although the propulsion system 24 is shown attached to the wing 14 in FIG. 1, in other embodiments it may additionally or alternatively include one or more aspects coupled to other parts of the aircraft 10, such as, for example, the empennage 16, the fuselage 12, or both.

For the exemplary aspect depicted, the propulsion system 24 includes an engine, and more specifically includes a pair of engines. More specifically, still, each of the engines in the pair of engines is configured as a gas turbine engine 26 mounted to one of the respective wings 14 of the aircraft 10 in an under-wing configuration through a respective pylon 28. Each gas turbine engine 26 is capable of selectively generating a propulsive thrust for the aircraft 10. The amount of propulsive thrust may be controlled at least in part based on a volume of fuel provided to the gas turbine engines 26 via the fuel system 20. In at least certain of the exemplary embodiments described herein, the fuel is a cryogenic fuel that is stored at very low temperatures, and more specifically is a hydrogen fuel store substantially in a liquid phase. In such a manner, it will be appreciated that the hydrogen fuel is stored in the fuel tank 22 at a low temperature. For example, the hydrogen fuel may be stored in the fuel tank 22 at about −253 Deg. Celsius or less at an atmospheric pressure, or at other temperatures and pressures to maintain the hydrogen fuel substantially in the liquid phase. The fuel tank 22 may be made from known materials such as titanium, Inconel, aluminum or composite materials.

Figure 2:
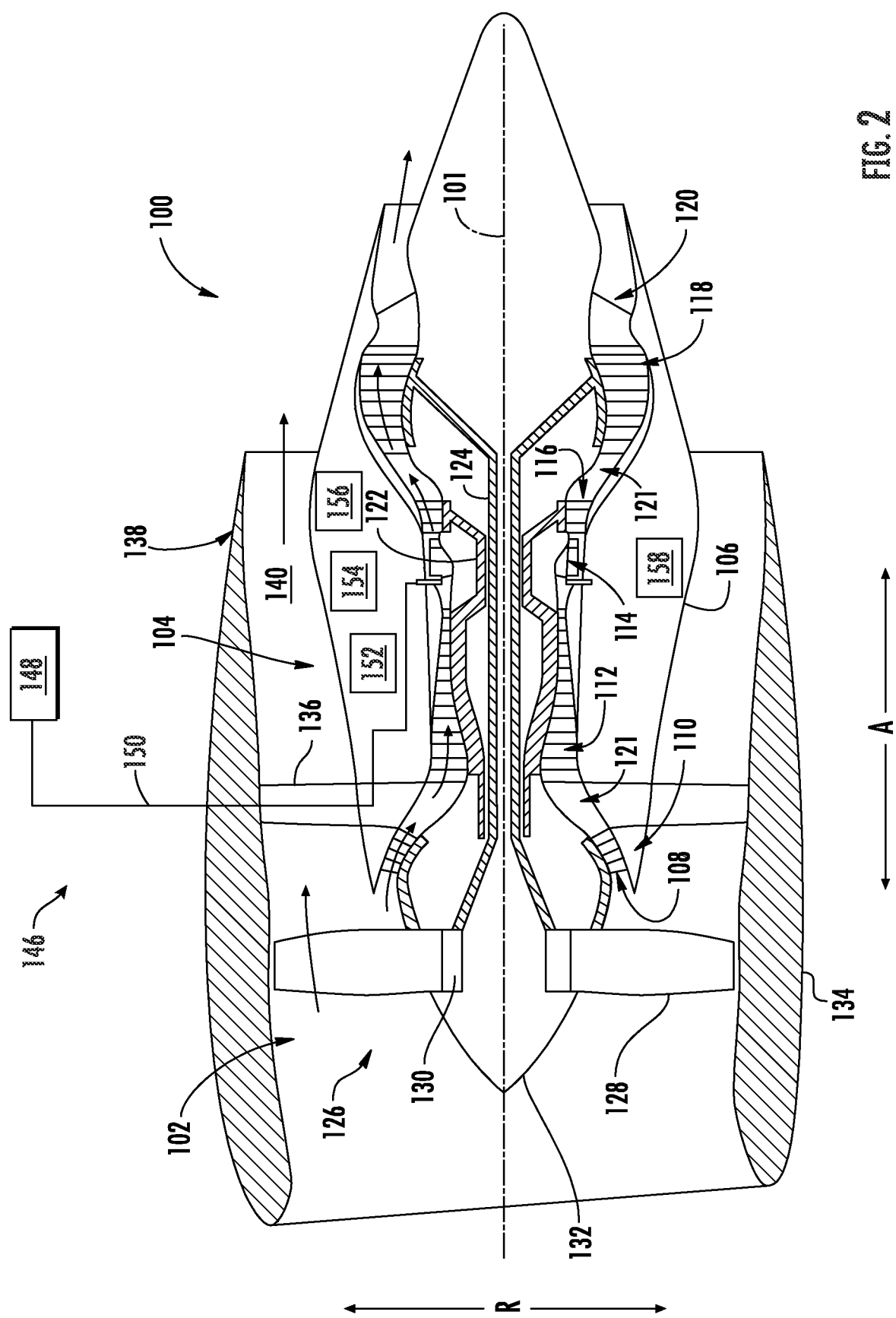
FIG. 2 is a schematic, cross-sectional view of a gas turbine engine in accordance with an exemplary embodiment of the present disclosure.

Referring now to FIG. 2, a schematic, cross-sectional view of a gas turbine engine in accordance with an exemplary embodiment of the present disclosure is provided. For example, the exemplary gas turbine engine of FIG. 2 may be incorporated into propulsion system 24 described above with reference to FIG. 1 as one of the gas turbine engines 26.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 2). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 2, the turbofan engine 100 is operable with a fuel system 146 for receiving a flow of fuel from the fuel system 146. The fuel system 146 may be configured similarly to the fuel system 20 of FIG. 1. Accordingly, the fuel system 146 generally includes a fuel tank 148, and a fuel delivery assembly 150. The fuel delivery assembly 150 provide a fuel flow from the fuel tank 148 to the engine 100, and more specifically to a fuel manifold (not labeled) of the combustion section 114 of the turbomachine 104 of the turbofan engine 100.

Moreover, as is depicted schematically, the exemplary turbofan engine 100 further includes various accessory systems to aid in the operation of the turbofan engine 100 and/or an aircraft including the turbofan engine 100. For example, the exemplary turbofan engine 100 further includes a main lubrication system 152 configured to provide a lubricant to, e.g., various bearings and gear meshes in the compressor section, the turbine section, the HP spool 122, the LP spool 124, etc. The lubricant provided by the main lubrication system 152 may increase the useful life of such components and may remove a certain amount of heat from such components. Additionally, the turbofan engine 100 includes a compressor cooling air (CCA) system 154 for providing air from one or both of the HP compressor 112 or LP compressor 110 to one or both of the HP turbine 116 or LP turbine 118. Moreover, the exemplary turbofan engine 100 includes an active thermal clearance control (ACC) system 156 for cooling a casing of the turbine section to maintain a clearance between the various turbine rotor blades and the turbine casing within a desired range throughout various engine operating conditions. Furthermore, the exemplary turbofan engine 100 includes a generator lubrication system 158 for providing lubrication to an electronic generator (not shown), as well as cooling/heat removal for the electronic generator. The electronic generator may provide electrical power to, e.g., a startup electric motor for the turbofan engine 100 and/or various other electronic components of the turbofan engine 100 and/or an aircraft including the turbofan engine 100.

Heat from these accessory systems 152, 154, 156, 158, and other accessory systems may be provided to various heat sinks as waste heat from the turbofan engine 100 during operation (e.g., to various vaporizers, as discussed below). Additionally, although not depicted, the turbofan engine 100 may include one or more heat exchangers within, e.g., the turbine section or exhaust section 120 for extracting waste heat from an airflow therethrough, such that the waste heat may be utilized to add heat to various heat sinks as waste heat during operation (e.g., to various vaporizers, as discussed below).

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 152, 154, 156, 158 discussed above.

Figure 3:
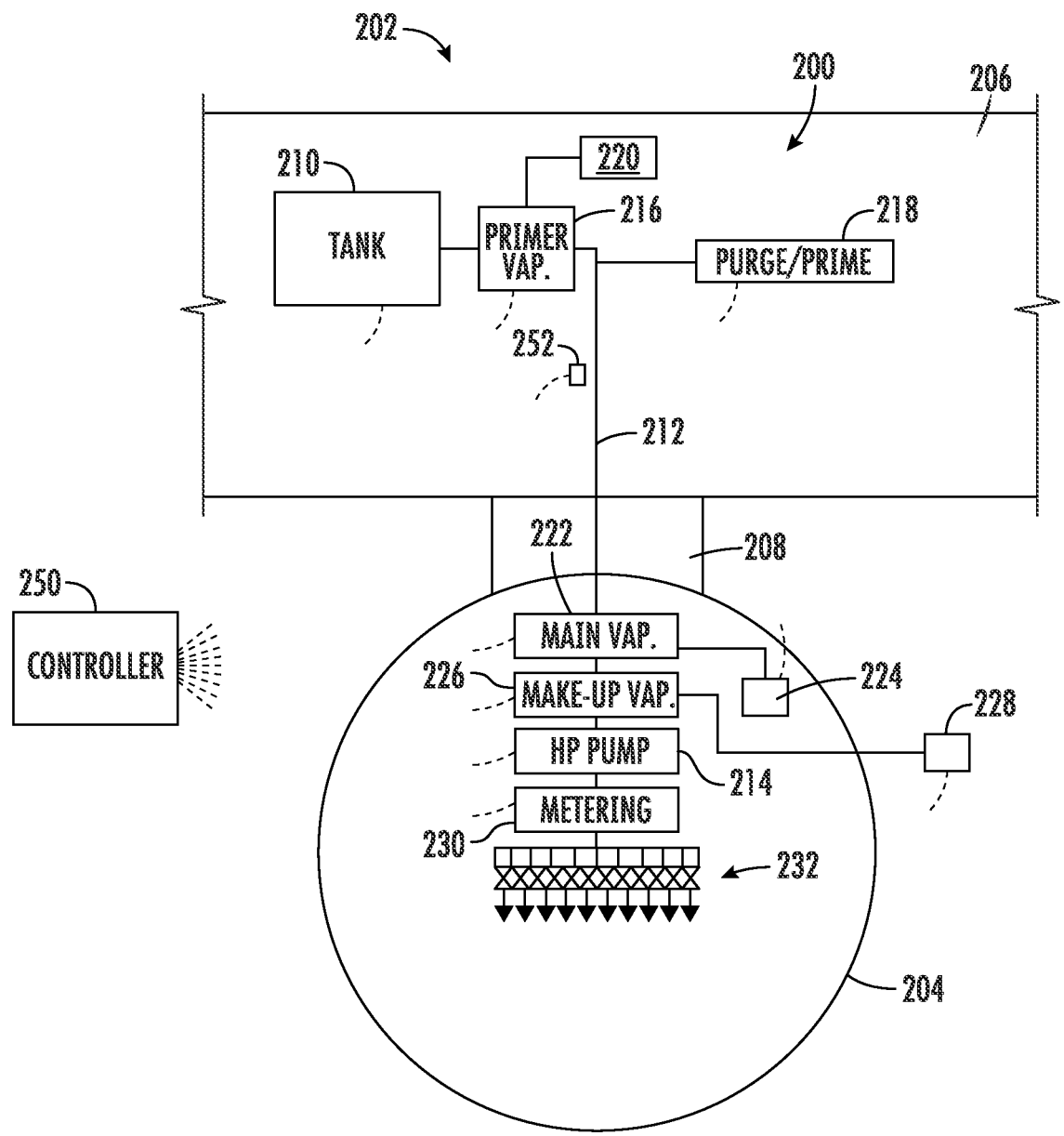
FIG. 3 is a schematic view of a fuel system in accordance with an exemplary aspect of the present disclosure.

Referring now to FIG. 3, a schematic view of a fuel system 200 for a vehicle 202 having an engine 204 in accordance with an exemplary embodiment of the present disclosure is provided. More specifically, for the exemplary embodiment of FIG. 3, the vehicle 202 may be an aeronautical vehicle, such as the exemplary aircraft 10 of FIG. 1, and the engine 204 may be an aeronautical gas turbine engine, such as the exemplary engines 26 of FIG. 1 and/or the exemplary turbofan engine 100 of FIG. 2. Accordingly, as depicted, the vehicle 202 includes a wing 206, with the engine 204 mounted to the wing 206 through a pylon 208 in an under-wing configuration.

It will be appreciated, however, that in other embodiments, the vehicle may be any other suitable land or aeronautical vehicle and the engine may be any other suitable engine mounted to or within the vehicle in any suitable manner.

The exemplary fuel system 200 depicted is generally a hydrogen fuel system configured to store a hydrogen fuel in a liquid phase and provide the hydrogen fuel to the engine 204 in a gaseous phase or a supercritical phase.

For the embodiment shown, the fuel system 200 generally includes a fuel tank 210 for holding the hydrogen fuel and a fuel delivery assembly 212 extending from the fuel tank 210 to the engine 204 for providing the hydrogen fuel from the fuel tank 210 to the engine 204. The fuel tank 210 may be configured hold the hydrogen fuel at least partially within the liquid phase, and may be configured to provide hydrogen fuel to the fuel system 200 substantially completely in the liquid phase, such as completely in the liquid phase. For example, the fuel tank 210 may define a fixed volume, such that as the fuel tank 210 provides hydrogen fuel to the fuel system 200 substantially completely in the liquid phase, a volume of the liquid hydrogen fuel in the fuel tank 210 decreases, and the volume is made up by, e.g., gaseous hydrogen. The fuel tank 210 and fuel system 200 may include a variety of supporting structure to facilitate storing the hydrogen fuel in such a manner.

It will be appreciated that as used herein, the term "substantially completely" as used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, such as at least 75% by mass of the described portion of the hydrogen fuel being in the stated phase.

Moreover, as will be explained in more detail below, the exemplary fuel system 200 includes a vaporizer in communication with the fuel delivery assembly 212 for heating the hydrogen fuel in the liquid phase to a gaseous phase, to a supercritical phase, or both, as well as a high pressure pump 214 in fluid communication with the fuel delivery assembly 212 at a location downstream of the vaporizer for inducing a flow of the hydrogen fuel through the fuel delivery assembly 212 to the engine 204.

The high pressure pump 214 may generally be the primary source of pressure rise in the fuel delivery assembly 212 between the fuel tank 210 and the engine 204. The high pressure pump 214 may be configured to increase a pressure in the fuel delivery assembly 212 to a pressure greater than a pressure within a combustion chamber of the engine 204. For example, the high pressure pump 214 may be configured to increase a pressure in the fuel delivery assembly 212 to at least 400 pounds per square inch ("psi"), such as to at least 500 psi, such as to at least 600 psi, such as to at least 700 psi, such as to at least 750 psi, such as up to 2000 psi.

Particularly for the embodiment of FIG. 3, the fuel tank 210 and vaporizer are each positioned within a fuselage of the vehicle 202 (not shown in FIG. 3, see, e.g., fuselage 12 of FIG. 1), the wing 206 of the vehicle 202, or both. More particularly, for the embodiment shown, the vaporizer is a primer vaporizer 216. As will be appreciated, hydrogen fuel defines a relatively low boiling point, such that if the hydrogen fuel were provided through the fuel delivery assembly 212 in the liquid phase, hydrogen fuel may freeze a gas within the fuel delivery assembly 212. Accordingly, the primer vaporizer 216 is provided to receive a flow of the hydrogen fuel in the liquid phase and heat the hydrogen fuel from the liquid phase to a gaseous phase or to a supercritical phase, such that the heated hydrogen fuel does not freeze the gas within the fuel delivery assembly 212. Operation of the primer vaporizer 216 may occur, e.g., prior to startup of the engine 204 wherein a non-hydrogen gas is positioned within the fuel delivery assembly 212 at a location between the tank and the engine 204.

Pre-startup operations will be described in more detail below. However, briefly, it will be appreciated that the fuel system further includes a purge/prime assembly 218, which may be configured provide a flow of primer fluid or pre-primer fluid to the fuel delivery assembly 212 during the pre-startup operations in conjunction with the operation of the primer vaporizer 216 to introduce a gas to the fuel delivery assembly 212 that may be contacted with the hydrogen fuel during subsequent operations without freezing. For example, the purge/prime assembly 218 may be configured to provide a flow of helium gas (which has a lower freezing point than the hydrogen fuel) through the fuel delivery assembly 212. Alternatively, the purge/prime assembly 218 may provide a gas having a higher freezing point through the fuel delivery assembly as, e.g., a pre-primer fluid and the fuel system 200 may subsequently operate the primer vaporizer 216 to introduce hydrogen fuel in a gaseous state at a temperature above the freezing point of the pre-primer fluid to introduce hydrogen fuel to the fuel delivery assembly 212 without freezing the gas within the fuel delivery assembly. The pre-primer fluid may be, e.g., nitrogen.

In certain exemplary embodiments, the purge/prime assembly 218 may include a fluid tank for providing the flow of pre-primer fluid when in use. Additionally, or alternatively, the purge/prime assembly 218 may include an on-board generating system, such as an on-board nitrogen generating system. The on board nitrogen generating system may include.

Referring still to FIG. 3, the primer vaporizer 216, as noted, is in communication with the fuel delivery assembly 212 and the fuel delivery assembly 212 may include one or more lines, conduits, etc. capable of carrying the hydrogen fuel between the fuel tank 210 in the engine 204. The primer vaporizer 216 is more specifically in thermal communication with the hydrogen fuel in the one or more lines, conduits, etc. of fuel delivery assembly 212. For example, the primer vaporizer 216 may be in fluid communication with the fuel delivery assembly 212 for receiving a flow of hydrogen fuel and positioning such flow of hydrogen fuel in thermal communication with heat provided thereto. Alternatively, the primer vaporizer 216 may be in thermal communication with the flow of hydrogen fuel in the fuel delivery assembly 212 in any other suitable manner (e.g., the primer vaporizer 216 may include coils or other structure contacting the fuel delivery assembly 212 for adding heat to the flow of hydrogen fuel therethrough).

Heat provided to the primer vaporizer 216 may be provided from a heat source 220, with the primer vaporizer 216 being in thermal communication with the heat source 220. The heat source 220 is, for the exemplary embodiment depicted, external to the engine 204. For example, the heat source providing heat to the primer vaporizer 216 may include an electric power source (in which case the primer vaporizer 216 may include one or more electric resistance heaters or the like), a catalytic heater or burner, a bleed airflow from an auxiliary power unit, etc. In such a manner, the heat source 220 may provide heat for the primer vaporizer 216 independent of whether or not the engine 204 is running (generally it will not be).

As will be described in more detail, below, the primer vaporizer 216 may operate prior to startup of the engine 204 to provide an initial volume of gas/fluid in the fuel delivery assembly capable of contacting the hydrogen fuel without freezing. In such manner, it will be appreciated that the primer vaporizer 216 may be configured to heat a relatively small flow of hydrogen fuel in the liquid phase and provide such heated hydrogen fuel to the fuel delivery assembly 212 in substantially completely a gaseous phase or substantially completely a supercritical phase.

Referring still to FIG. 3, it will be appreciated that the exemplary fuel system 200 depicted further includes a second vaporizer, or main vaporizer 222, in communication with the fuel delivery assembly 212 for heating the hydrogen fuel flowing through the fuel delivery assembly 212. Notably, for the exemplary aspect depicted, the main vaporizer 222 is positioned external to the fuselage and the wing 206 of the vehicle 202, and instead is positioned at least partially within the pylon 208, the engine 204, or both. More specifically, for the embodiment shown, the main vaporizer 222 is positioned at least partially within the engine 204.

The main vaporizer 222 is configured to operate once the engine 204 is in a thermally stable condition. More specifically, for the exemplary embodiment shown, the main vaporizer 222 is in thermal communication with a heat source 224 of the engine 204. In such manner, it will be appreciated that the main vaporizer 222 may be configured to operate once the engine 204 is capable of providing enough heat via the heat source 224 to the main vaporizer 222 to facilitate operation of the main vaporizer 222 as described herein.

The heat source 224 of the engine 204 may be one of the exemplary heat sources described above with reference FIG. 2, or alternatively, the heat source 224 of the engine 204 may include a plurality of the exemplary heat sources described above with reference to FIG. 2 operable together as a thermal bus. Additionally, or alternatively, still, any other suitable heat source of the engine 204 may be utilized as the heat source 224 for the main vaporizer 222. For example, in other exemplary embodiments, the heat source 224 for the main vaporizer may be a heat source external to the engine (e.g., a dedicated burner or other catalytic heater, an electric resistance heater, an airflow from an auxiliary power unit, etc.).

As noted, the main vaporizer 222 is in communication with a flow of the hydrogen fuel through the fuel delivery assembly 212. The main vaporizer 222 may be in communication with the flow of hydrogen fuel through the fuel delivery assembly 212 in any suitable manner, such as in the same manner described above with reference to the primer vaporizer 216, or in any other suitable manner. The main vaporizer 222 may be configured to heat the flow of fuel from a substantially completely liquid phase to a substantially completely gaseous phase or to a substantially completely supercritical phase.

Further, still, for the exemplary embodiment of FIG. 3, the fuel system 200 further includes a third vaporizer, or more specifically, a makeup vaporizer 226. The makeup vaporizer 226 is also in communication with the fuel delivery assembly 212 for heating the hydrogen fuel flowing through the fuel delivery assembly 212. The makeup vaporizer 226 includes or is in thermal communication with a heat source 228 external to the engine 204. As used herein, the term "heat source external to the engine 204" refers to a heat source that does not rely on heat generated through operation of the engine 204. For example, the makeup vaporizer 226 may include or be in thermal communication with, e.g., one or more electric resistance heaters, a catalytic heater or burner, a bleed air flow from an auxiliary power unit, etc.

The exemplary makeup vaporizer 226 depicted in FIG. 3 is positioned external to the fuselage and the wing 206 of the vehicle 202. For example, the makeup vaporizer 226 depicted in FIG. 3 is positioned at least partially in the pylon 208 or the engine 204, and more specifically, is for the exemplary aspect depicted, positioned at least partially within the engine 204.

Referring still to FIG. 3, as briefly noted above, the fuel system 200 additionally includes the high pressure pump 214 at a location downstream of the vaporizer, and more specifically downstream of the primer vaporizer 216. For the exemplary embodiment depicted, the high pressure pump 214 is positioned external to the fuselage and the wing 206 of the vehicle 202, and more specifically, is positioned at least partially within the pylon 208 of the vehicle 202, or at least partially within the engine 204 of the vehicle 202. More specifically, still, the exemplary high pressure pump 214 of FIG. 3 is positioned at least partially within the engine 204.

The high pressure pump 214 may be configured to induce the flow of hydrogen fuel through the fuel delivery assembly 212 from the tank to the engine 204 during operation of the engine 204. The high pressure pump 214 may operate best when it receives a flow that is substantially completely a single phase. For the exemplary embodiment depicted, the high pressure pump 214 is located downstream of the main vaporizer 222 and downstream of the makeup vaporizer 226. In such a manner, it will be appreciated that the high pressure pump 214 is configured to receive the flow of hydrogen fuel in substantially completely a gaseous phase or a supercritical phase. Such may facilitate more a precise operation of the high pressure pump 214, a more efficient operation of the high pressure pump 214, or both.

Figure 4:
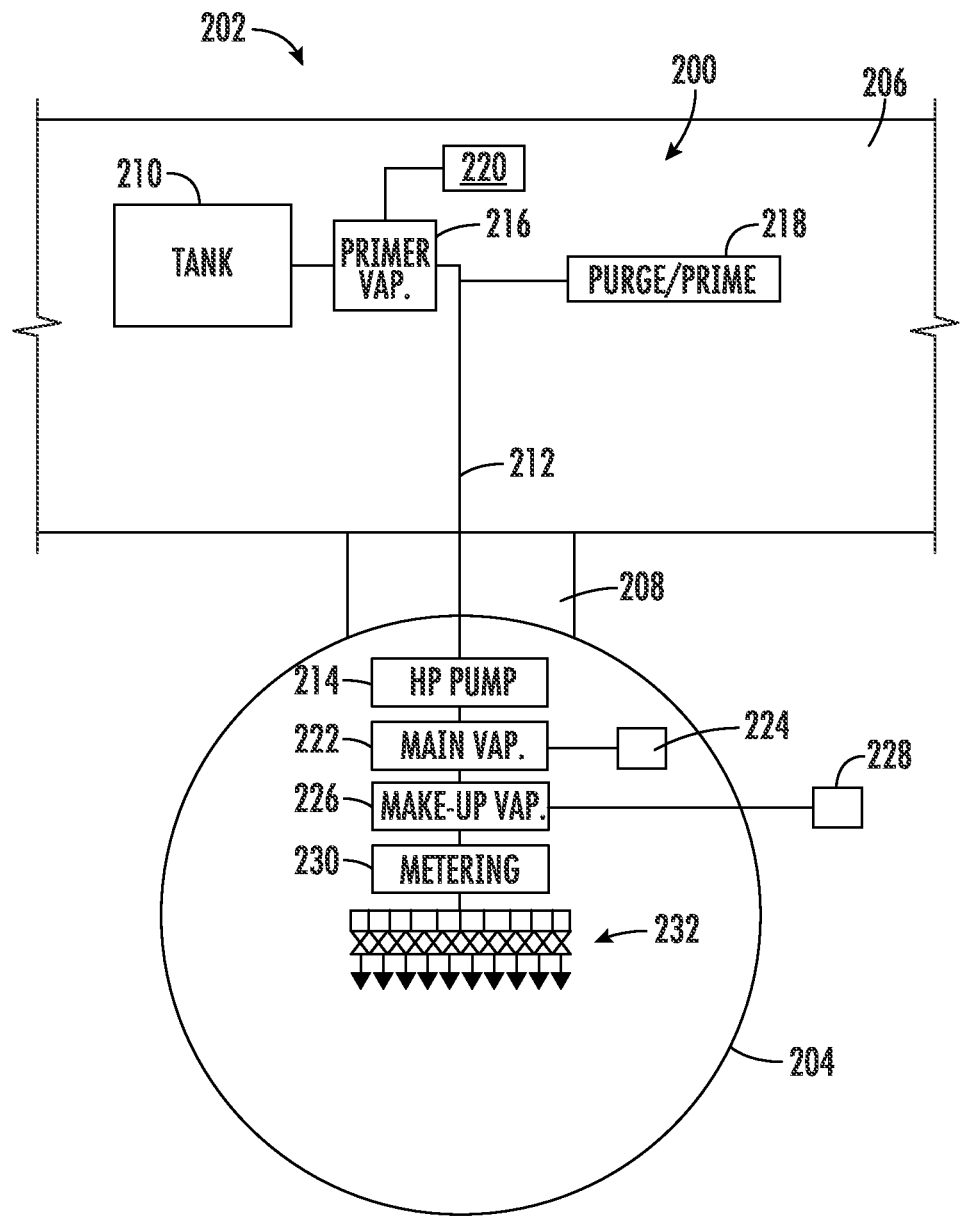
FIG. 4 is a schematic view of a fuel system in accordance with another exemplary aspect of the present disclosure.

It will be appreciated, however, that in other exemplary embodiments, the high pressure pump 214 may be positioned at any other suitable location. For example, reference will now be made briefly to FIG. 4, providing a schematic view of a fuel system 200 for vehicle 202 in accordance with another exemplary embodiment of the present disclosure. The exemplary fuel system 200 of FIG. 4 is configured in substantially the same manner as exemplary fuel system 200 of FIG. 3. However, for the exemplary embodiment of FIG. 4, the high pressure pump 214 is located upstream of the main vaporizer 222 and upstream of the makeup vaporizer 226. In such a manner, the high pressure pump 214 may be configured to receive the flow of hydrogen fuel through the fuel delivery assembly 212 in a substantially completely liquid phase during operation of the engine 204. Notably, for the exemplary embodiment of FIG. 4, the high pressure pump 214 is still located external to the wing 206 and fuselage of the vehicle 202, and positioned at least partially within the pylon 208 or the engine 204, and more specifically, at least partially within the engine 204.

Referring now back to FIG. 3, it will be appreciated that the fuel system 200 further includes a fuel metering unit 230 in fluid communication with fuel delivery assembly 212 downstream of the vaporizer and the high pressure pump 214, and more specifically, downstream of the primer vaporizer 216, downstream of the main vaporizer 222, downstream of the makeup vaporizer 226, and downstream of the high pressure pump 214. In such manner, the fuel system 200 is configured to provide the fuel metering unit 230, and the fuel metering unit 230 is configured to receive, hydrogen fuel in a substantially completely gaseous phase, or in a substantially completely supercritical phase.

The fuel metering unit 230 of the fuel system 200 is further configured to provide the flow of fuel to the engine 204 in a desired manner. More specifically, as depicted schematically in FIG. 3, the fuel metering unit 230 is configured to provide a desired volume of hydrogen fuel, at, e.g., a desired flow rate, to a fuel manifold 232 of the engine 204. The fuel manifold 232 may be configured to provide the hydrogen fuel received to a plurality of fuel nozzles within a combustion section of the engine 204 to facilitate mixing the hydrogen fuel with compressed air and combusting the mixture of hydrogen fuel and compressed air to generate combustion gases that drive the engine 204.

Figure 5:
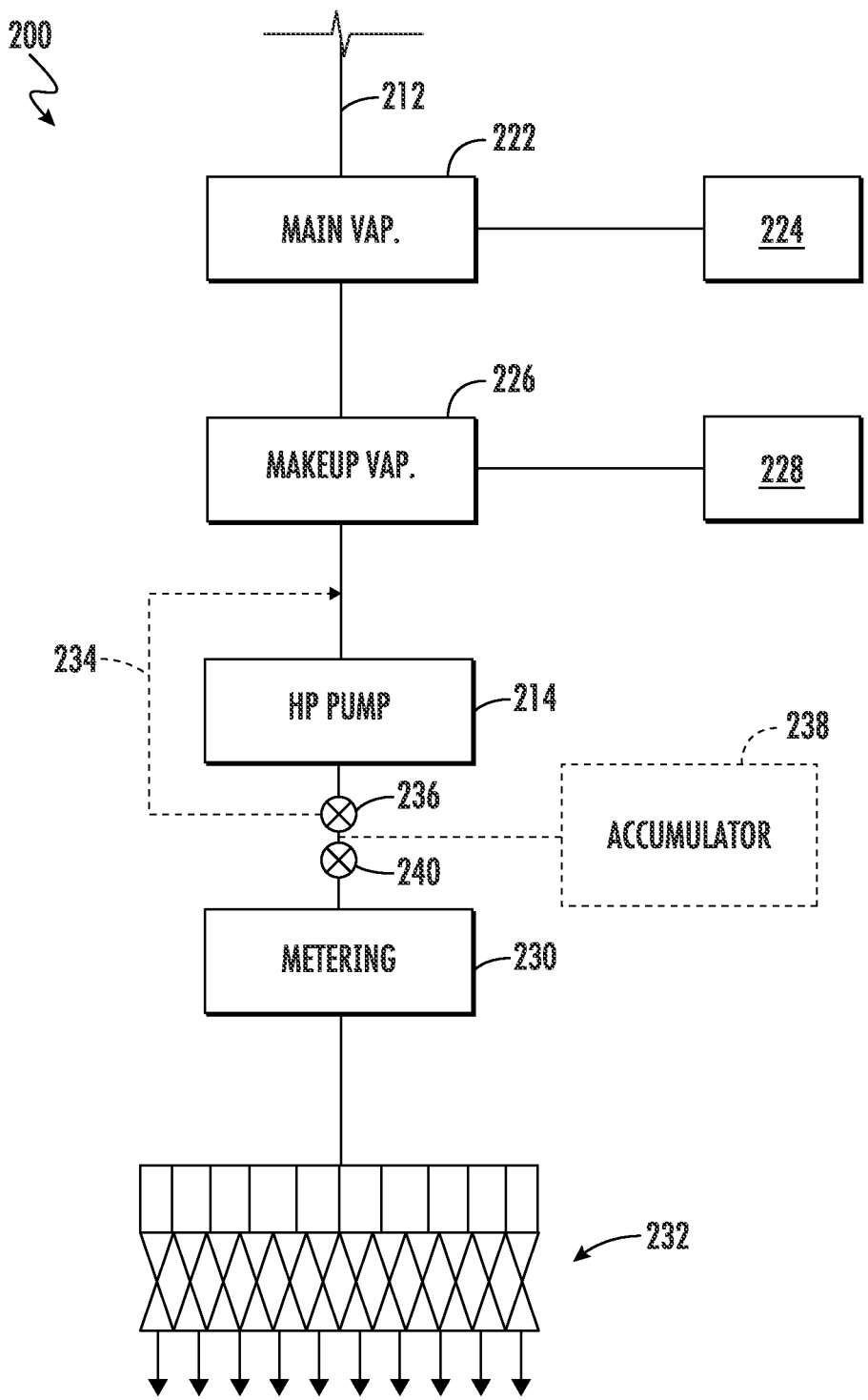
FIG. 5 is close up, schematic view of the exemplary fuel system of FIG. 3.

Referring now also to FIG. 5, a close-up, schematic view is depicted of a portion of the exemplary fuel system 200 described above with reference to FIG. 3. It will be appreciated that in certain exemplary aspects, the engine 204 may be operated across transient conditions requiring changes in fuel flows to the engine 204. In order to accommodate one or more of these changes, the fuel system 200 may include features to redirect or absorb excess fuel flows within the fuel delivery assembly 212.

For example, as is depicted in FIG. 5, in certain exemplary embodiments, the fuel system 200 may include a recirculation flowpath 234 for redirecting excess fuel flow within the fuel delivery assembly 212. In certain exemplary embodiments, the recirculation flowpath 234 may be in fluid communication with the fuel delivery assembly 212 at a location downstream of the high pressure pump 214 and at a location upstream of the high pressure pump 214. More specifically, the fuel delivery assembly 212 may include a recirculation overflow valve 236 fluidly connecting the recirculation flowpath 234 to the fuel delivery assembly 212 at a location downstream of the high pressure pump 214 and upstream of the fuel metering unit 230 for providing fuel flow in excess of a desired amount to the recirculation flowpath 234. The recirculation flowpath 234 may provide the received excess fuel flow back to the fuel delivery assembly 212 at a location upstream of the high pressure pump 214 and downstream of the main vaporizer 222 and the makeup vaporizer 226.

Moreover, for the exemplary embodiment depicted in FIG. 5, the fuel system 200 further includes an accumulator 238 in fluid communication with the fuel delivery assembly 212 for receiving an overflow of hydrogen fuel from the fuel delivery assembly 212. The accumulator 238 is, for the embodiment shown in FIG. 5, in fluid communication with the fuel delivery assembly 212 at a location downstream of the high pressure pump 214 and upstream of the fuel metering unit 230. More specifically, for the embodiment shown, the fuel delivery assembly 212 includes an accumulator overflow valve 240 for providing the excess fuel flow from the fuel delivery assembly 212 to the accumulator 238.

The accumulator overflow valve 240 may be a pressure actuated valve, may be an electrically actuated valve (operated in response to, e.g., sensed pressure values), etc. Further, the accumulator 238 may provide fuel flow back to the fuel delivery assembly 212 under certain conditions (e.g., transient conditions requiring higher fuel flows).

It will be appreciated, however, that in other exemplary embodiments, any other suitable configuration may be provided. For example, in other embodiments, the fuel system 200 may not include both the recirculation flowpath 234 and the accumulator 238, and instead may include only one of the recirculation flowpath 234 or the accumulator 238. Alternatively, in other embodiments, the fuel system 200 may not include either of the recirculation flowpath 234 or the accumulator 238, or may include one or both of these features at any other suitable location, having other suitable configurations.

Referring now back to FIG. 3, the fuel system 200 further includes one or more features for expelling any remaining hydrogen fuel within the fuel delivery assembly 212 during or after a shutdown of the engine 204. More specifically, the exemplary fuel system 200 FIG. 3 includes the purge/prime assembly 218, briefly mentioned above, in fluid communication with the fuel delivery assembly 212. The purge/prime assembly 218 may provide a flow of purge fluid through the fuel delivery assembly 212 during a shutdown of the engine 204 or following a shutdown of the engine 204. The purge fluid may be substantially completely oxygen free gas. For example, the purge fluid may be a nitrogen gas, helium gas, etc.

For the embodiment shown, the purge/prime assembly 218 located proximate the fuel tank 210 relative to the fuel manifold 232. More specifically, for the embodiment shown, the purge/prime assembly 218 is positioned in the wing 206, in airflow communication with the fuel delivery assembly 212 at a location just downstream from the primer vaporizer 216, and upstream of the main vaporizer 222 and high pressure pump 214.

In such manner, the hydrogen fuel within the fuel delivery assembly 212, as well as the hydrogen fuel within the fuel manifold 232 and fuel nozzles of the engine 204, may be removed during the shutdown of the engine 204 or following the shutdown of the engine 204. In certain exemplary embodiments, the hydrogen fuel may be vented to atmosphere, or alternatively may be recaptured during operation of the purge/prime assembly 218. As will be appreciated, hydrogen fuel may be capable of seeping through any fuel lines or conduits of the fuel delivery assembly 212 if it were to remain in the fuel delivery assembly 212. Accordingly, purging the hydrogen fuel from the fuel delivery assembly 212 may prevent such seepage of the hydrogen fuel and, e.g., accumulation of the hydrogen fuel at undesirable locations.

Although the exemplary embodiment depicted includes the purge/prime assembly 218 having the functions described herein, in other exemplary embodiments, the purge/prime assembly 218 may be configured as two separate configuration, or may only be configured to perform one of the purge functions or prime functions.

It will be appreciated, however, that in other exemplary embodiments, the fuel system 200 may have any other suitable configurations.

Figure 6:
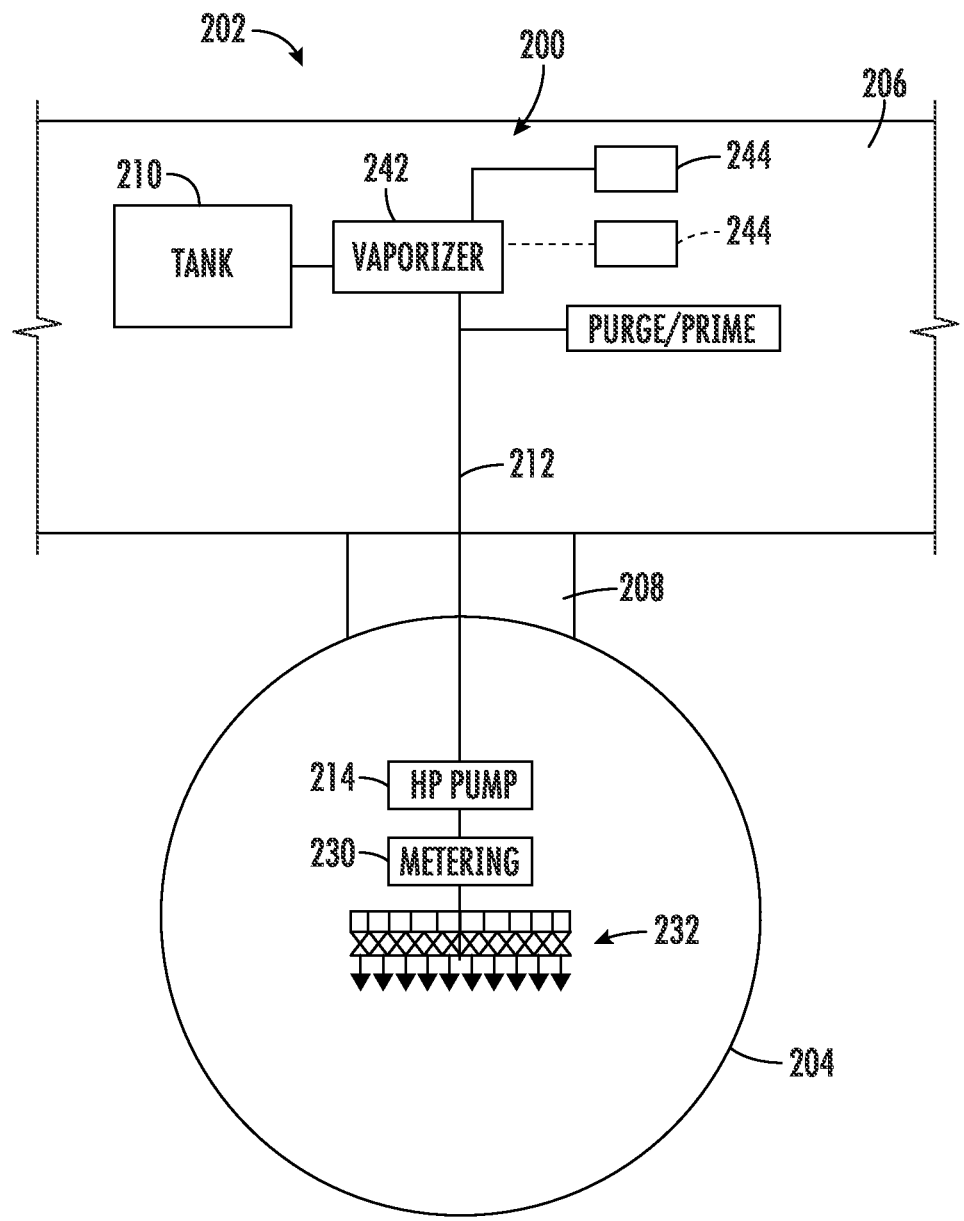
FIG. 6 is a schematic view of a fuel system in accordance with still another exemplary aspect of the present disclosure.

For example, referring briefly to FIG. 6, a fuel system 200 in accordance with another exemplary embodiment of the present disclosure is provided. The exemplary fuel system 200 of FIG. 6 may be configured in a substantially similar manner as the exemplary fuel system 200 described above with reference FIG. 3. For example, the exemplary fuel system 200 of FIG. 6 generally includes a fuel tank 210, a fuel delivery assembly 212, a vaporizer in communication with the fuel delivery assembly 212, and a high pressure pump 214 also in fluid communication with the fuel delivery assembly 212 at a location downstream of the vaporizer.

However, for the exemplary embodiment depicted, the fuel system 200 does not include separate primer vaporizer 216, main vaporizer 222, and makeup vaporizer 226. Instead, for the exemplary embodiment depicted FIG. 6, the fuel system 200 includes a dual function vaporizer. The dual function vaporizer may be configured to operate in a pre-start operating condition as a primer vaporizer and in a thermally stable operating condition as a main vaporizer. Additionally, or alternatively, the dual function vaporizer may be configured to operate in a pre-start operating condition as a primer vaporizer and in a thermally stable operating condition as a main vaporizer.

More specifically, for the exemplary embodiment depicted FIG. 6, the fuel system 200 only includes a primary vaporizer 242. The primary vaporizer 242, as noted, is upstream of the high pressure pump 214 and is positioned external to the engine 204. More specifically, the primary vaporizer 242 of FIG. 6 is located external to the engine 204 and external to the pylon 208. More specifically, still, for the exemplary embodiment of FIG. 6, the primary vaporizer 242 is positioned at least partially within the fuselage of the aircraft or the wing 206 of the aircraft, such as at least partially within the wing 206 of the aircraft. The primary vaporizer 242 of FIG. 6 is configured to perform the same functions as the primer vaporizer 216 and makeup vaporizer 226 described above with reference to FIG. 3. In such manner, it will be appreciated that the primary vaporizer 242 includes or is in thermal communication with a heat source 244 other than a waste heat source of the engine 204. For example, in certain exemplary embodiments, the primary vaporizer 242 incorporated or utilizes, or is in thermal communication with, a burner, a catalytic heater, a bleed air flow from an auxiliary power unit, or an electric resistance heater. This may facilitate operation of the primary vaporizer 242 prior to the engine 204 operating in a thermally stable operating condition.

Notably, as depicted schematically, the primary vaporizer 242 may further include or be in thermal communication with a plurality of heat sources 244. At least one of the plurality of heat sources 244 may be an engine heat source, such as one or the exemplary sources described above with reference to FIG. 2. In such a manner, it will be appreciated that prior to the engine 204 operating in a thermally stable operating condition, the primary vaporizer 242 may be in thermal communication with a heat source 244 other than a waste heat source of the engine 204, and further once the engine 204 is operating in a thermally stable operating condition, the primary vaporizer 242 may be in thermal communication with a waste heat source of the engine 204. Such may facilitate more efficient operation of the fuel system 200.

Notably, although only one vaporizer, the primary vaporizer 242, is depicted in FIG. 6, in other embodiments, the primary vaporizer 242 may instead only perform the functions of the primer vaporizer 216 and makeup vaporizer 226 (each using a heat source external to the engine 204), and the fuel system may further include a separate main vaporizer 222.

Figure 7:
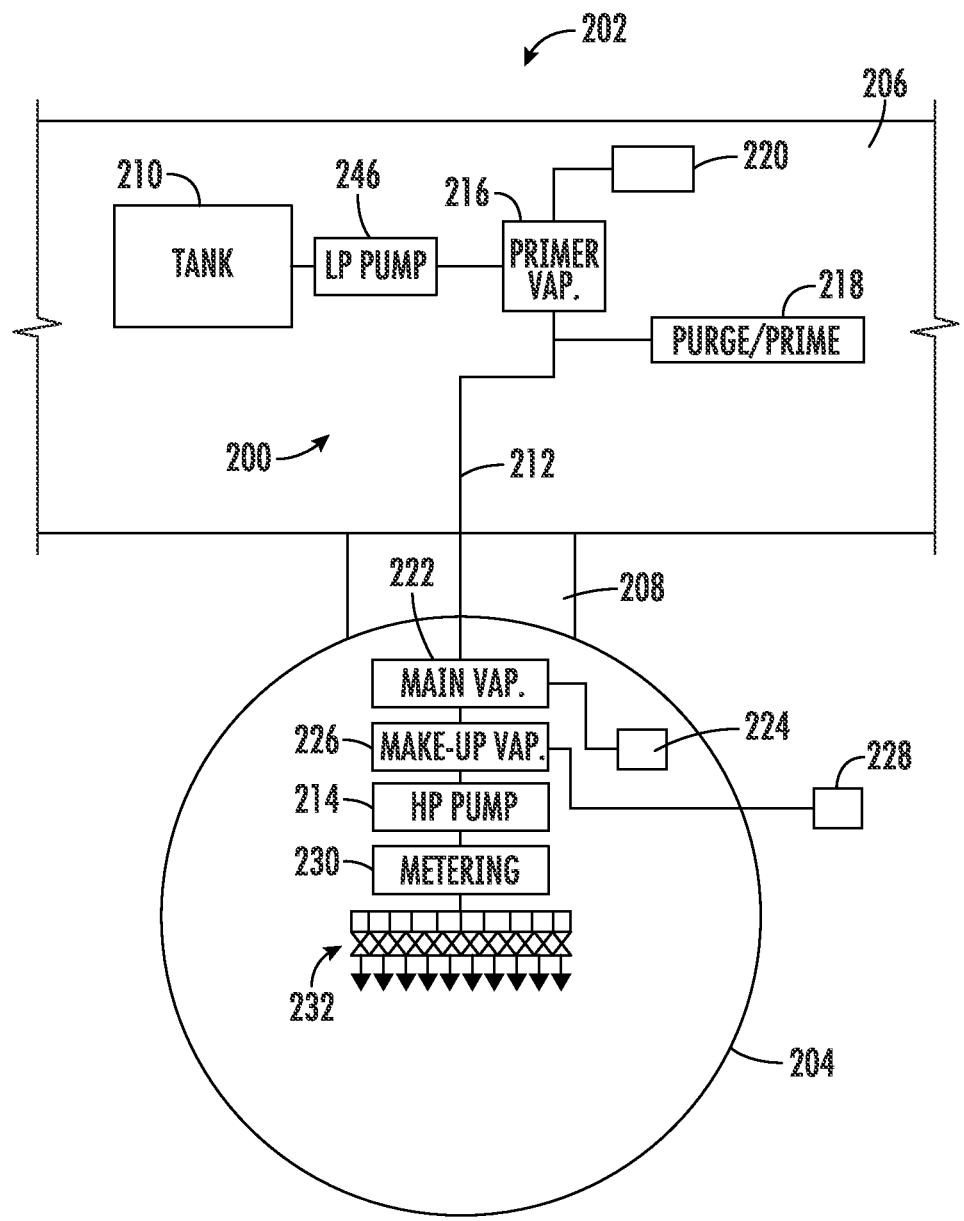
FIG. 7 is a schematic view of a fuel system in accordance with yet another exemplary aspect of the present disclosure.

Furthermore, it will be appreciated that in certain exemplary embodiments, the fuel system 200 may further include aspects for assisting with fuel flow through the fuel delivery assembly 212. For example, in certain exemplary embodiments, the fuel tank 210 may be a pressurized fuel tank 210 configured to maintain a pressure in excess of 50 pounds per square inch absolute ("psia") during operation of the vehicle 202 and engine 204, such as at least 70 psia, such as up to 500 psia. Additionally or alternatively, in other exemplary embodiments, the fuel system 200 may further include a supplementary pump. For example, reference will now be made briefly to FIG. 7, providing a schematic view of a fuel system 200 in accordance with yet another exemplary embodiment of the present disclosure. The exemplary fuel system 200 FIG. 7 may be configured in substantially the same manner as exemplary fuel system 200 of FIG. 3. However, for the exemplary embodiment of FIG. 7, the fuel system 200 further includes a low pressure pump 246. The low pressure pump 246 is, for the embodiment shown, located upstream of the vaporizer, and more specifically, located upstream of the primer vaporizer 216. The low pressure pump 246 may be configured to provide an initial pressurization to induce a flow of the hydrogen fuel through the fuel delivery assembly 212. It will be appreciated that the low pressure pump 246 may be configured to provide less of a pressure rise within the fuel delivery assembly 212 than the high pressure pump 214. For example, in certain exemplary embodiments, the low pressure pump 246 may be configured to provide a pressure rise of between 20 psi and 300 psi, such as between 50 psi and 200 psi, whereas the high pressure pump 214 may be configured to provide a pressure rise between 200 psi and 2000 psi, such as at least 500 psi, such as at least 750 psi. In such a manner, it will be appreciated that the low pressure pump 246 may be configured to provide less than 80% of the pressure rise of the high pressure pump 214, such as less than 70%, such as less than 60%, such as less than 50%, such as less than 40%, such as less than 30%, such as less than 20%, such as at least 5% of the pressure rise of the high pressure pump 214.

Further, still, in other exemplary embodiments, other suitable configurations may be provided for the fuel system 200. For example, referring now to FIG. 8, a schematic view of a fuel system 200 in accordance with yet another exemplary embodiment of the present disclosure is provided. The exemplary fuel system 200 of FIG. 8 may be configured in a similar manner as exemplary fuel system 200 FIG. 3. For example, the exemplary fuel system 200 of FIG. 8 generally includes a fuel tank 210, a fuel delivery assembly 212, a vaporizer, and high pressure pump 214. However, for the exemplary embodiment of FIG. 8, the high pressure pump 214 of the fuel system 200 is located upstream of the vaporizer. Notably, with such a configuration, the high pressure pump 214 may be configured to receive fuel flow from the fuel tank 210 at a known phase. For the exemplary embodiment depicted, the high pressure pump 214 is located external to the engine 204, and more specifically, external to the pylon 208 and the engine 204, and more specifically, at least partially within the fuselage or the wing 206 of the aircraft, and more specifically, still, is positioned at least partially within the wing 206 of the aircraft.

Figure 8:
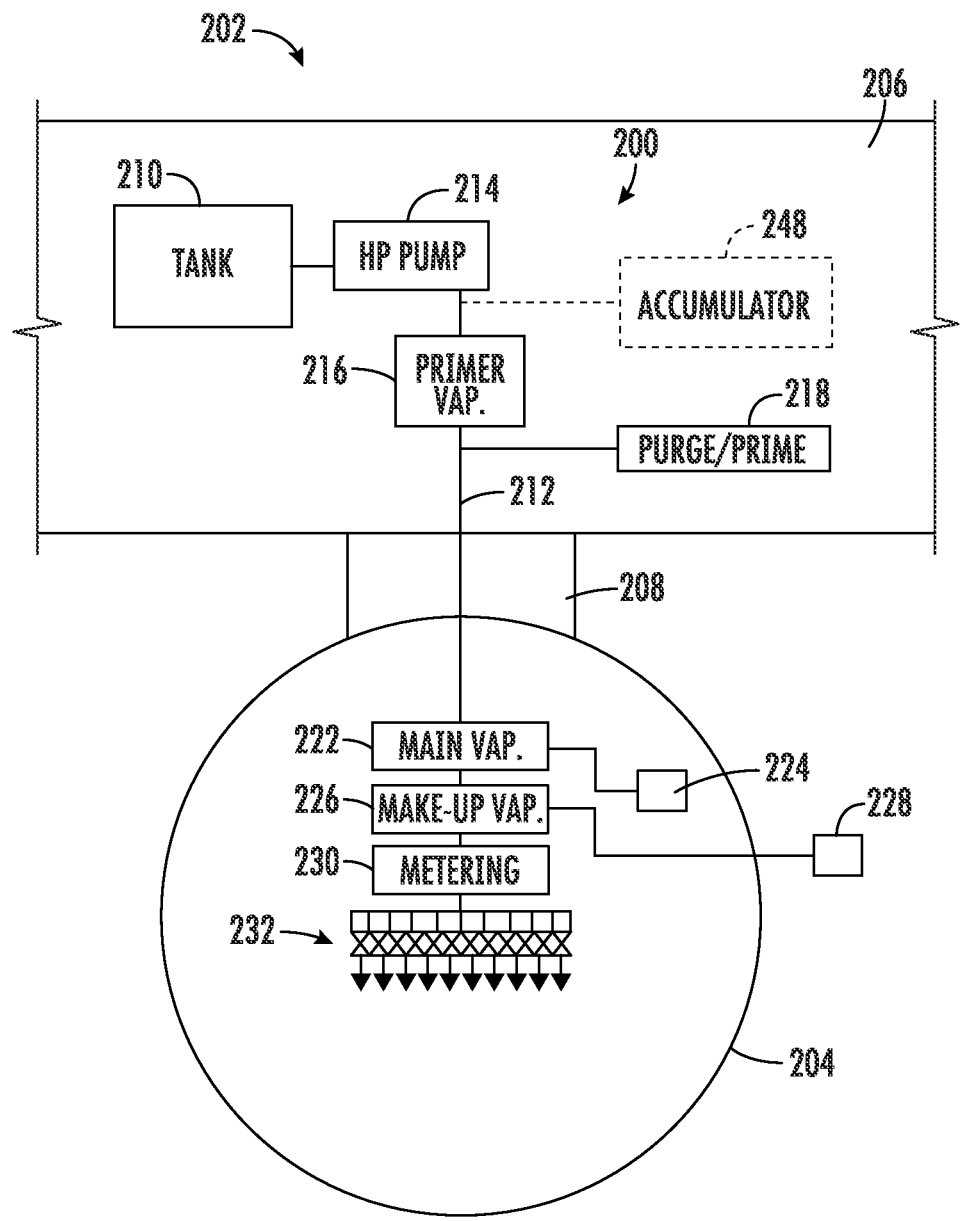
FIG. 8 is a schematic view of a fuel system in accordance with still another exemplary aspect of the present disclosure.

As with the embodiment described above with reference to FIGS. 3 and 5, the exemplary fuel system 200 of FIG. 8 may include an accumulator 248 in fluid communication with the fuel delivery assembly 212 for accepting an overflow of fuel. Notably, for the embodiment shown, the accumulator 248 is located upstream of the vaporizer, more specifically, upstream of a primer vaporizer 216, a main vaporizer 222, and a makeup vaporizer 226. Such may assist with accepting overflow fuel in the fuel delivery assembly 212 as a result of, e.g., an engine transient to a low power mode and vaporization of liquid fuel already in the fuel delivery assembly 212.

Referring now back to FIG. 3, it will be appreciated that the fuel system 200 further includes a controller 250. The controller 250 may be a controller dedicated to the exemplary fuel system 200, or alternatively may be incorporated or configured as part of a controller for the engine 204 (such as a full authority digital engine control, "FADEC," controller for the engine 204), a controller for the vehicle 202, etc.

The controller 250 is in operable communication with various aspects of the fuel system 200. For example, for the embodiment shown, the controller 250 is in operable communication with the primer vaporizer 218, the main vaporizer 222, the makeup vaporizer 226, the high pressure pump 214, the fuel metering unit 230, and the purge/prime assembly 218. The controller 250 may further be in operable communication with, e.g., the fuel tank 210, the heat source 224 for the main vaporizer 222, the heat source 228 for the makeup vaporizer 226, the heat source 220 for the primer vaporizer 216, one or more sensors 252 configured since data indicative of various operating conditions of the fuel delivery assembly 212 (e.g., temperatures, pressures, etc.), etc.

In such a manner, it will be appreciated that the controller 250 may be configured to control various operations of the fuel system 200 depending on, e.g., an operating condition of the engine 204, the vehicle 202, or both. For example, as will be appreciated from the description herein, the controller 250 may be configured to operate the primer vaporizer 216 when the engine 204 is in a first operating condition, may be configured to operate the makeup vaporizer 226 when the engine 204 is in a second operating condition, and may further be configured to operate the main vaporizer 222 when the engine 204 is in a third operating condition.

For example, the controller 250 may be configured to operate the primer vaporizer 216 when the engine 204 is in a pre-start operating condition. The pre-start operating condition may be an operating condition prior to startup of the engine 204, such as an operating condition prior to combusting any fuel within the engine 204. When operating the primer vaporizer 216 in the pre-start operating condition, the controller 250 may be configured to remove non-hydrogen fluid from the various lines and conduits of the fuel delivery assembly 212, such that when hydrogen fuel is subsequently provided to the fuel delivery assembly 212, it does not freeze the non-hydrogen fluid within the fuel delivery assembly 212. In such a manner, the controller 250 may be configured to operate the primer vaporizer 216 to heat up hydrogen fuel from a liquid phase to a gaseous phase or supercritical phase, more specifically may be configured to heat up hydrogen fuel to a temperature in excess of a freezing point for ambient air, for purge fluid, or both. Additionally or alternatively, the controller 250 may be configured to provide a pre-primer fluid flow through the fuel delivery assembly 212 from the purge/primer assembly 218 prior to introducing the hydrogen fuel heated by the primer vaporizer 216. The pre-primer fluid may define a relatively low freezing point, even if it is greater than the freezing point of the hydrogen fuel.

Further, the controller 250 may be configured to operate the makeup vaporizer 226 when the engine 204 is operating in a startup operating condition, prior to the engine 204 operating in a thermally stable operating condition. In such a manner, the controller 250 may be configured to utilize the makeup vaporizer 226 prior to the engine 204 being in a condition to provide sufficient excess heat to increase a temperature of the hydrogen fuel to the point where it is in a substantially completely gaseous phase or a substantially completely supercritical phase.

Subsequently, the controller 250 may be configured to operate the main vaporizer 222 once the engine 204 is in a thermally stable operating condition, such that it may provide a sufficient amount of heat to increase a temperature of the hydrogen fuel to the point where it is in a substantially completely gaseous phase or a substantially completely supercritical phase.

Notably, the controller 250 may be configured to only operate one of the primer vaporizer 216, the makeup vaporizer 226, or the main vaporizer 222 at a time, or alternatively, may be configured to overlap operation of two of these vaporizers while transitioning between the first and second operating conditions, or between the second third operating conditions.

The controller 250 may further be configured to operate the fuel system 200 during a shutdown mode. When shutting down the engine 204, the controller 250 may be configured to turn off operation of the high pressure pump 214 (and other pumps within the fuel system 200) to allow the engine 204 to burn any high-pressure hydrogen fuel in the fuel manifold 232 and shut down.

Additionally, or alternatively, the controller 250 may be configured to operate the purge/prime assembly 218 to inject purge fluid into the fuel delivery assembly 212 during shutdown, prior to shutting down, e.g., the high pressure pump 214 or a low pressure pump 246, if provided. In such a manner, the purge fluid may force any remaining hydrogen gas within the fuel delivery assembly 212 into the engine 204 to burn off prior to the engine 204 shutting down.

Additionally, or alternatively, the controller 250 may be configured to operate the purge/prime assembly 218 to inject purge fluid into the fuel delivery assembly 212 after shutdown. In such a manner, the hydrogen fuel within the fuel delivery assembly 212 may be vented to atmosphere, or recaptured with, e.g., a dedicated tank.

In certain exemplary aspects, when the purge fluid defines a freezing point higher than a boiling point of hydrogen, the controller 250 may wait for a temperature of the hydrogen gas within the fuel delivery assembly 212 to exceed the boiling point of the purge fluid prior to injecting the purge fluid into the fuel delivery assembly 212. For example, when the purge fluid is, e.g., nitrogen, the controller 250 may wait for a temperature of the hydrogen fuel within the fuel delivery assembly 212 to exceed the boiling point of nitrogen prior to injecting the nitrogen to purge the fuel delivery assembly 212.

Notably, however, in other example aspects, the purge fluid may be, e.g., helium, in which case the controller 250 may not need to wait for the hydrogen fuel to increase in temperature prior to injecting the helium to purge the fuel delivery assembly 212.

Figure 9:
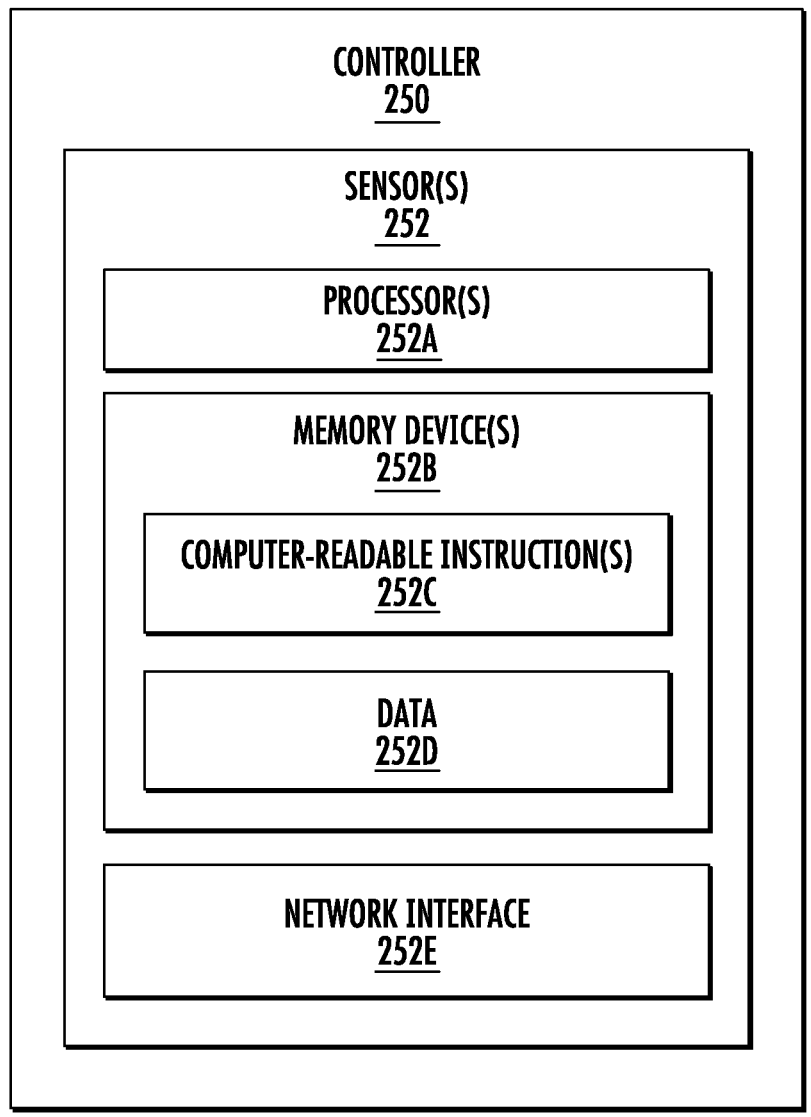
FIG. 9 is a schematic view of a controller in accordance with an exemplary aspect of the present disclosure.

Referring now to FIG. 9, an exemplary embodiment of a controller 250 as may be incorporated into the exemplary fuel system 200 FIG. 3 is provided. The controller 250 can include one or more computing device(s) 252. The computing device(s) 252 can include one or more processor(s) 252A and one or more memory device(s) 252B. The one or more processor(s) 252A can include any suitable processing device, such as a microprocessor, microcontroller 250, integrated circuit, logic device, and/or other suitable processing device. The one or more memory device(s) 252B can include one or more computer-readable media, including, but not limited to, non-transitory computer-readable media, RAM, ROM, hard drives, flash drives, and/or other memory devices.

The one or more memory device(s) 252B can store information accessible by the one or more processor(s) 252A, including computer-readable instructions 252C that can be executed by the one or more processor(s) 252A. The instructions 252C can be any set of instructions that when executed by the one or more processor(s) 252A, cause the one or more processor(s) 252A to perform operations. In some embodiments, the instructions 252C can be executed by the one or more processor(s) 252A to cause the one or more processor(s) 252A to perform operations, such as any of the operations and functions for which the controller 250 and/or the computing device(s) 252 are configured, the operations for operating a fuel system 200 (e.g., methods 300, 400, 500), as described herein, and/or any other operations or functions of the one or more computing device(s) 252. The instructions 252C can be software written in any suitable programming language or can be implemented in hardware. Additionally, and/or alternatively, the instructions 252C can be executed in logically and/or virtually separate threads on processor(s) 252A. The memory device(s) 252B can further store data 252D that can be accessed by the processor(s) 252A.

The computing device(s) 252 can also include a network interface 252E used to communicate, for example, with the other components of system 500 (e.g., via a network). The network interface 252E can include any suitable components for interfacing with one or more network(s), including for example, transmitters, receivers, ports, controller 250s, antennas, and/or other suitable components. One or more external display devices (not depicted) can be configured to receive one or more commands from the computing device (s) 252. For example, as is depicted in phantom in FIG. 3, the controller 250 may be in operable communication with a variety of components of the fuel system 200 through a wireless communications network.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 10:
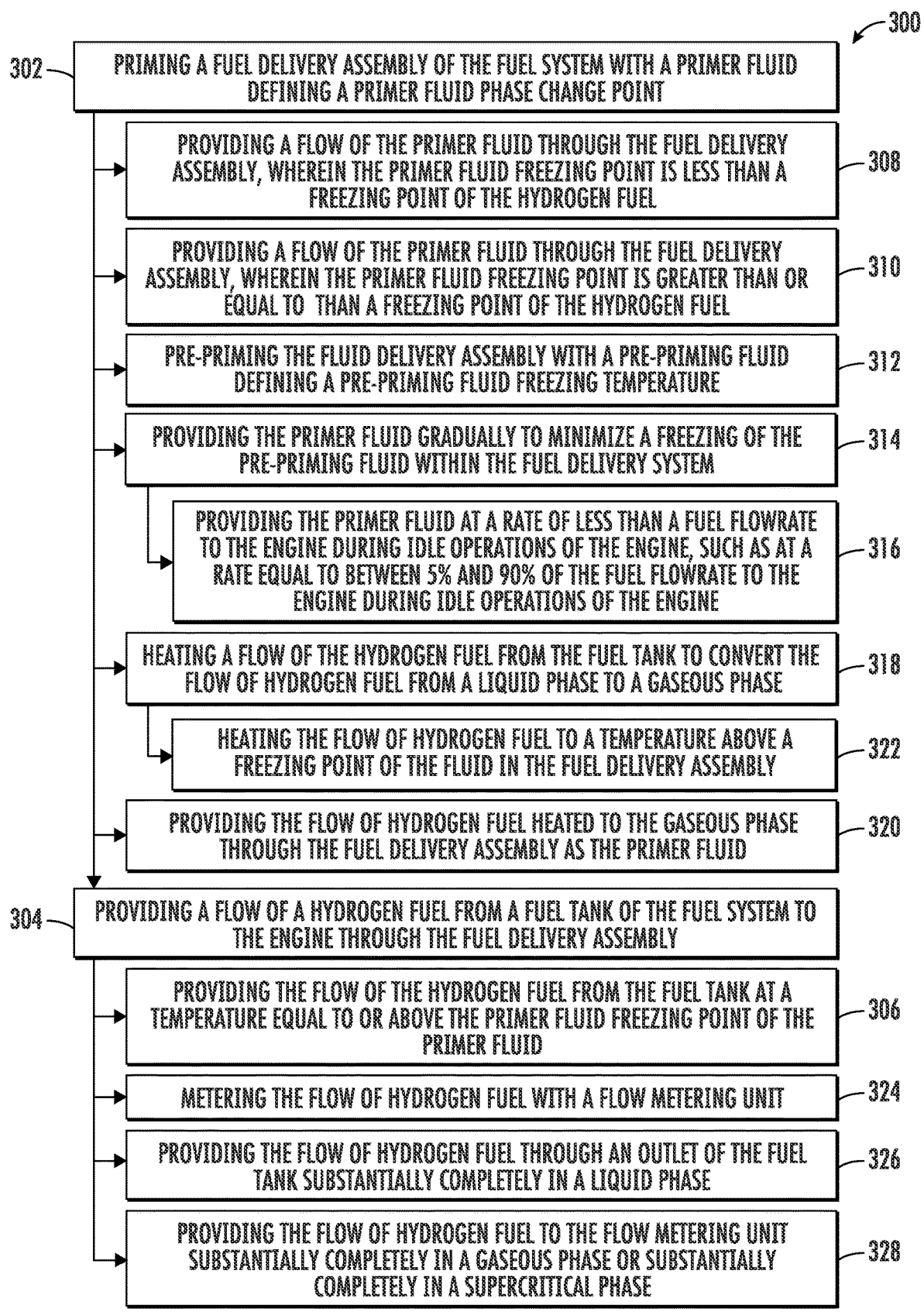
FIG. 10 is a flow diagram of a method for operating a fuel system in accordance with an exemplary aspect of the present disclosure.

Referring now to FIG. 10, a flow diagram of a method 300 of operating a fuel system for a vehicle having an engine is provided. The exemplary aspect of the method 300 depicted in FIG. 10 may be utilized to operate one or more of the exemplary fuel systems described above with reference to FIGS. 1 through 9. However, in other exemplary aspects, the method 300 may operate any other suitable fuel system for any other suitable vehicle and/or engine.

The method 300 includes at (302) priming a fuel delivery assembly of the fuel system with a primer fluid defining a primer fluid phase change point, and at (304) providing a flow of a hydrogen fuel from a fuel tank of the fuel system to the engine through the fuel delivery assembly. The hydrogen fuel within the fuel tank is at least partially in a liquid phase, and the fuel system is configured to provide hydrogen fuel form the fuel tank substantially completely in the liquid phase. Further, for the exemplary aspect of the method 300 depicted in FIG. 10, providing the flow of the hydrogen fuel from the fuel tank at (304) includes at (306) providing the flow of the hydrogen fuel from the fuel tank at a temperature equal to or above the primer fluid phase change point of the primer fluid. For the exemplary aspect depicted in FIG. 10, the primer fluid phase change point is a primer fluid freezing point.

Alternatively, however, the primer fluid phase change point may be a primer fluid boiling point. Such may prevent the primer fluid from transforming to a liquid and negatively affecting a flow of the primer fluid through the fuel system.

In such a manner, it will be appreciated that the method 300 may prime the fuel delivery assembly with a primer fluid to minimize a freezing of the primer fluid within the fuel delivery assembly during an initial operating phase of the engine.

More specifically, referring still to the exemplary aspect of the method 300 depicted in FIG. 10, priming the fuel delivery assembly of the fuel system with the primer fluid at (302) may include at (308) providing a flow of the primer fluid through the fuel delivery assembly, wherein the primer fluid freezing point is less than a freezing point of the hydrogen fuel. For example, the primer fluid may be a helium fluid. In such a manner, it will be appreciated that providing the flow of the primer fluid through the fuel delivery assembly at (308) may include providing the primer fluid through the fuel delivery assembly at a temperature greater than a freezing point of a fluid within the fuel delivery assembly (e.g., air).

It will be appreciated, however, that in other exemplary aspects, the method 300 may utilize other primer fluids. For example, still referring to FIG. 10, in other exemplary aspects, priming the fuel delivery assembly of the fuel system at (302) may include at (310) providing a flow of the primer fluid through the fuel delivery assembly, wherein the primer fluid freezing point is greater than or equal to than a freezing point of the hydrogen fuel. For example, the primer fluid may be the hydrogen fuel.

With such exemplary aspect, priming the fuel delivery assembly at (302) may further include at (312) pre-priming the fuel delivery assembly with a pre-priming fluid defining a pre-priming fluid freezing temperature. The pre-priming fluid freezing temperature may be within 150° C. of a freezing temperature of the hydrogen fuel, such as within 100° C. the freezing temperature of the hydrogen fuel, such as within 75° C. of the freezing point of the hydrogen fuel. For example, the pre-priming fluid may be nitrogen.

Further, with such an exemplary aspect priming the fuel delivery assembly of the fuel system at (302) may further include at (314) providing the primer fluid gradually to minimize a freezing of the pre-priming fluid within the fuel delivery system. For example, in certain exemplary aspects, providing the primer fluid gradually at (314) may include at (316) providing the primer fluid at a rate of less than a fuel flowrate to the engine during idle operations of the engine, such as at a rate equal to between 5% and 90% of the fuel flowrate to the engine during idle operations of the engine. Further, providing the primer fluid gradually at (314) may include providing the primer fluid in a gaseous phase.

Referring still to FIG. 10, with such an exemplary aspect, priming the fuel delivery assembly of the fuel system at (302) may further include at (318) heating a flow of the hydrogen fuel from the fuel tank to convert the flow of hydrogen fuel from a liquid phase to a gaseous phase, and at (320) providing the flow of hydrogen fuel heated to the gaseous phase through the fuel delivery assembly as the primer fluid. For example, in certain exemplary aspects, heating the flow of hydrogen fuel from the fuel tank at (318) may include an (322) heating the flow of hydrogen fuel to a temperature above a freezing point of the fluid in the fuel delivery assembly. For example, when a pre-primer fluid is utilized, heating the flow of hydrogen fuel at (322) may include heating the flow of hydrogen fuel to a temperature above the pre-primer freezing point. Alternatively, when a pre-primer fluid is not utilized, heating the flow of hydrogen fuel at (322) may include heating the flow of hydrogen fuel to a temperature above a freezing point of air.

Moreover, for the exemplary aspect of the method 300 depicted, it will be appreciated that providing the flow of hydrogen fuel from the fuel tank of the fuel system to the engine via fuel delivery assembly at (304) further includes at (324) metering the flow of hydrogen fuel with a flow metering unit. Fuel may be provided from the flow metering unit to, e.g., a fuel manifold of the engine and subsequently to one or fuel nozzles of the engine.

The fuel system operated in accordance with the exemplary method 300 described herein may allow for utilization of a hydrogen fuel as a fuel source for the engine, and more particularly may allow for storing the hydrogen fuel in a liquid phase, while providing hydrogen fuel in a gaseous phase to the engine for combustion. In such a manner, it will be appreciated that providing the flow of hydrogen fuel from the fuel tank of the fuel system to the engine at (304) further includes at (326) providing the flow of hydrogen fuel through an outlet of the fuel tank substantially completely in a liquid phase and at (328) providing the flow of hydrogen fuel to the flow metering unit substantially completely in a gaseous phase or substantially completely in a supercritical phase. More specifically, providing the flow of hydrogen fuel to the flow metering unit substantially completely in a gaseous phase or substantially completely in a supercritical phase at (328) includes in at least certain exemplary aspects providing the flow of hydrogen fuel to the flow metering unit substantially completely in a gaseous phase.

It will be appreciated that the exemplary method 300 may be utilized to prevent freezing of a fluid within the fuel delivery assembly during operation. More specifically, by priming the fuel delivery assembly in accordance with one or more of the exemplary aspects described herein prior to operating the engine, or rather, prior to providing a flow of hydrogen fuel to the engine for combustion, the fuel delivery assembly may be ready to accept the relatively cold hydrogen fuel from the fuel tank without causing undesirable delays and/or damage resulting from a freezing of a fluid within the fuel delivery assembly.

Figure 11:
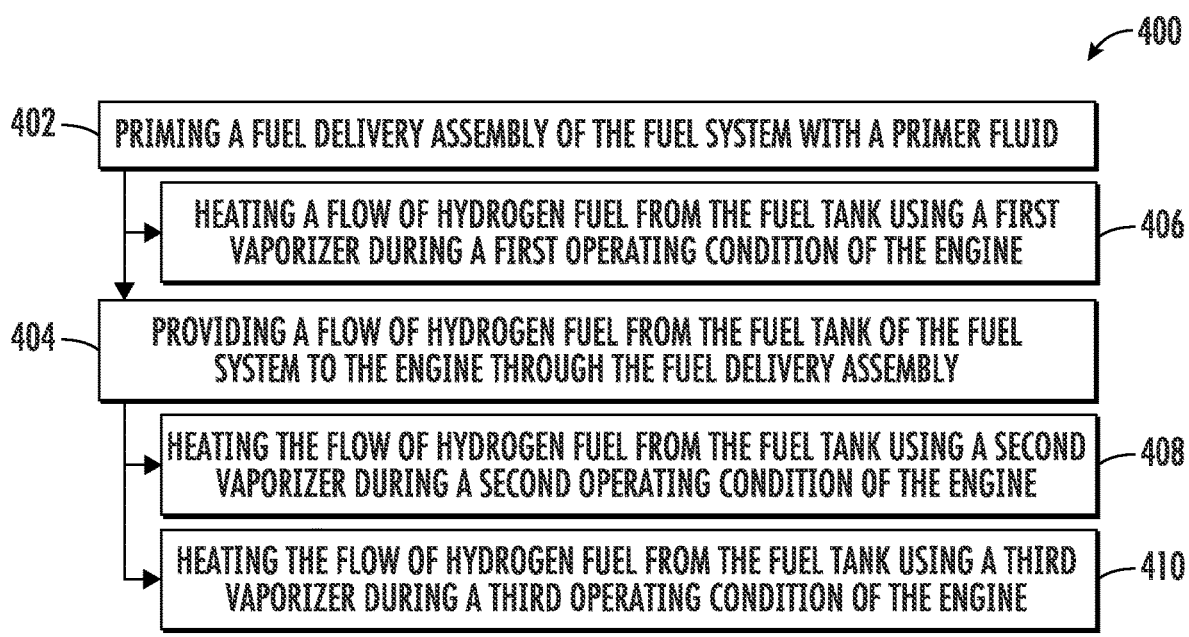
FIG. 11 is a flow diagram of a method for operating a fuel system in accordance with another exemplary aspect of the present disclosure.

Referring now to FIG. 11, another exemplary aspect of the present disclosure is depicted. More specifically, FIG. 11 provides a flow diagram of a method 400 for operating a fuel system in accordance with another example aspect of the present disclosure. The method 400 may be utilized to operate a fuel system in accordance with one or the exemplary embodiments described above with reference to FIGS. 1 through 9. However, in other exemplary aspects, the method 400 may be utilized to operating fuel system having any other suitable configuration.

The method 400 includes at (402) priming a fuel delivery assembly of the fuel system with a primer fluid, and at (404) providing a flow of hydrogen fuel from the fuel tank of the fuel system to the engine through the fuel delivery assembly.

For the exemplary aspect depicted, the primer fluid includes the hydrogen fuel, and priming the fuel delivery assembly at (402) includes at (406) heating a flow of hydrogen fuel from the fuel tank using a first vaporizer during a first operating condition of the engine. Further, for the exemplary aspect depicted, providing the flow of hydrogen fuel from the fuel tank to the engine at (404) includes at (408) heating the flow of hydrogen fuel from the fuel tank using a second vaporizer during a second operating condition of the engine. More specifically, for the exemplary aspect depicted, providing the flow of hydrogen fuel from the fuel tank to the engine at (404) further includes at (410) heating the flow of hydrogen fuel from the fuel tank using a third vaporizer during a third operating condition of the engine.

For the exemplary aspect depicted, the first vaporizer is a primer vaporizer and the first operating condition is a pre-start operating condition the engine. The pre-start operating condition of the engine may be an operating condition prior to providing hydrogen fuel to the engine for combustion. Further for the exemplary aspect depicted, the second vaporizer is a makeup vaporizer and the second operating condition is a startup operating condition of the engine. Further, still, for the exemplary aspect depicted, the third vaporizer is a main vaporizer and the third operating condition is a thermally stable operating condition of the engine.

Notably, each of the vaporizers may be configured to receive heat from different heat sources to enable operation during the different operating conditions of the engine. For example, the primer vaporizer may be configured to receive heat from a heat source external to the engine, such that heating the flow of hydrogen fuel from the fuel tank at (406) may include providing heat to the first vaporizer from the heat source external to the engine. Similarly, the makeup vaporizer may also be configured to receive heat from a heat source external to the engine, such that heating the flow of hydrogen fuel from the fuel tank at (408) may include providing heat to the second vaporizer from the heat source external to the engine. Further, the main vaporizer may be configured to receive heat from a heat source internal to the engine, such that heating the flow of hydrogen fuel from the fuel tank at (410) may include providing heat to the third vaporizer from the engine. The heat source(s) external to the engine may include, e.g., one or more catalytic heat sources or burners, bleed airflows from an auxiliary power unit, electric resistance heaters, etc. The heat sources internal to the engine may include, e.g., one or more waste heat sources of the engine, such as one or more of the heat sources described above with reference FIG. 2.

Notably, although the method 400 includes a separate primer vaporizer and a separate makeup vaporizer, in other exemplary aspects of the method 400, the fuel system may include a single vaporizer performing the functions of both the primer vaporizer and the makeup vaporize, the single vaporizer configured to receive heat from a heat source external to the engine. Such an exemplary aspect of the method 400 may still include a separate main vaporizer.

In such a manner, will be appreciated that the exemplary method 400 of FIG. 11 may be capable of providing heat to a flow of hydrogen fuel from the fuel tank through the fuel delivery assembly across a variety of operating conditions of the engine. For example, the example method 400 of FIG. 11 may allow for priming the fuel delivery assembly using hydrogen fuel prior to operating the engine, may allow for heating of the flow of hydrogen fuel from the fuel tank prior to the engine operating in a thermally stable operating condition, and further may allow for efficient heating of the flow of hydrogen fuel from the fuel tank after the engine reaches a thermally stable operating condition by utilizing waste heat from the engine.

Figure 12:
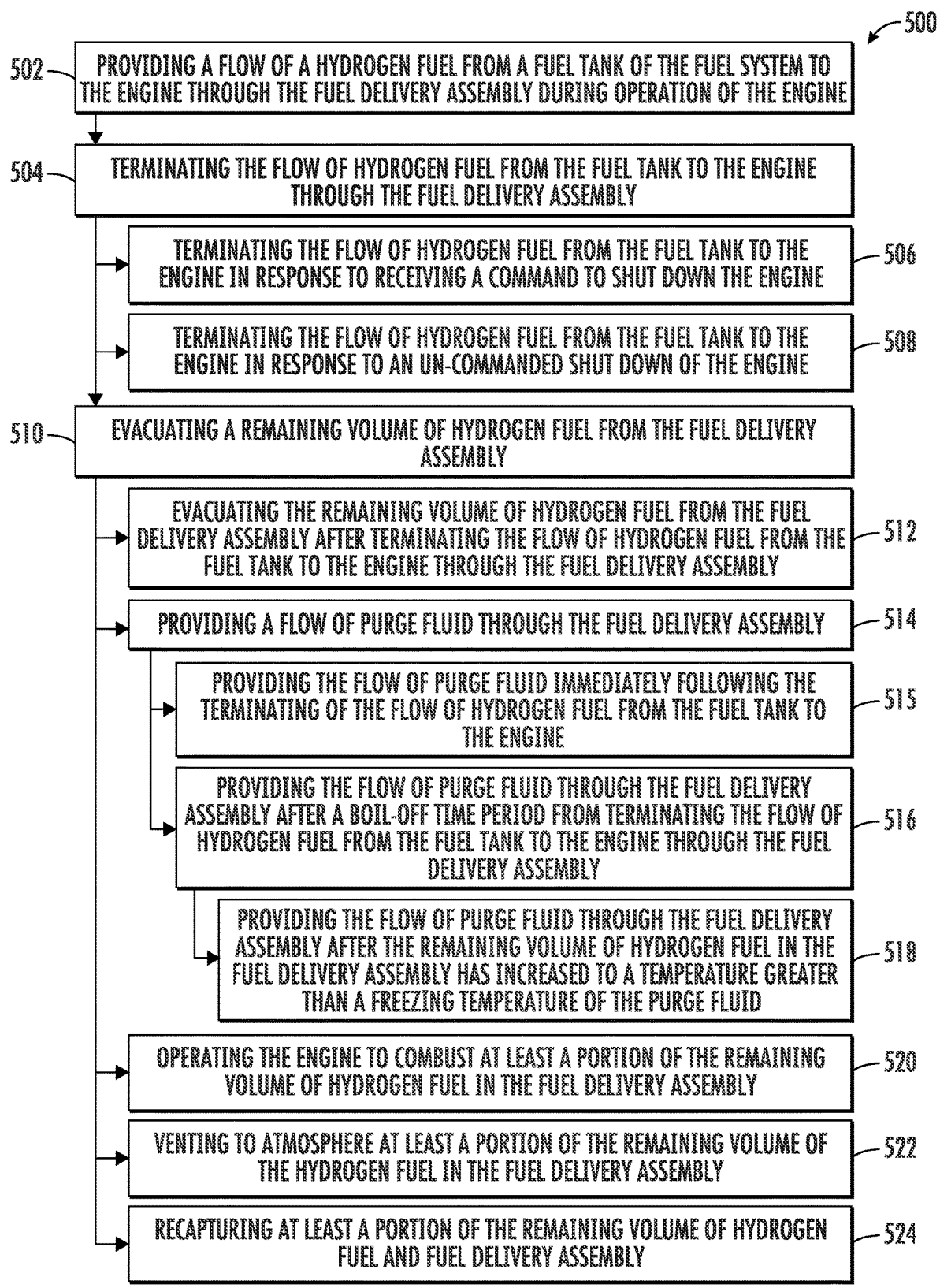
FIG. 12 is a flow diagram of a method for operating a fuel system in accordance with yet another exemplary aspect of the present disclosure.

Referring now to FIG. 12, a flow diagram of a method 500 of operating a fuel system for a vehicle having an engine is provided. The method 500 may be operable with a fuel system configured in a manner similar to one or more of the exemplary fuel systems described above with reference to FIGS. 1 through 9. However, another exemplary aspects, the method 500 may be utilized with a fuel system having any other suitable configuration.

The method 500 includes at (502) providing a flow of a hydrogen fuel from a fuel tank of the fuel system to the engine through the fuel delivery assembly during operation of the engine.

The method further includes at (504) terminating the flow of hydrogen fuel from the fuel tank to the engine through the fuel delivery assembly. In certain exemplary aspects, terminating the flow of hydrogen fuel at (504) may include at (506) terminating the flow of hydrogen fuel from the fuel tank to the engine in response to receiving a command to shut down the engine, or at (508) terminating the flow of hydrogen fuel from the fuel tank to the engine in response to an un-commanded shut down of the engine. Further, with certain exemplary aspects, terminating the flow of hydrogen fuel from the fuel tank to the engine at (504) may include turning off one or more pumps in communication with the fuel delivery assembly (e.g., the high pressure pump and, if provided, the low pressure pump).

Moreover, it will be appreciated that for the exemplary method 500 depicted in FIG. 12, the method 500 further includes at (510) evacuating a remaining volume of hydrogen fuel from the fuel delivery assembly. The remaining volume of hydrogen fuel refers to the volume of hydrogen fuel in the fuel delivery assembly following the termination of the flow of hydrogen fuel from the fuel tank to the engine at (504). In such a manner, it will be appreciated that for the exemplary aspect depicted, evacuating the remaining volume of hydrogen fuel from the fuel delivery assembly at (510) includes at (512) evacuating the remaining volume of hydrogen fuel from the fuel delivery assembly after terminating the flow of hydrogen fuel from the fuel tank to the engine through the fuel delivery assembly at (504).

Moreover, for example aspect depicted, evacuating the remaining volume of hydrogen fuel from the fuel delivery assembly at (510) includes at (514) providing a flow of purge fluid through the fuel delivery assembly. The purge fluid defines a freezing point.

In certain exemplary aspects, the freezing point of the purge fluid may be less than the freezing point of the hydrogen fuel. For example, the purge fluid may be helium. In such an exemplary aspect, providing the flow of purge fluid through the fuel delivery assembly at (514) may include at (515) providing the flow of purge fluid immediately following the terminating of the flow of hydrogen fuel from the fuel tank to the engine at (504).

However, another exemplary aspects, the purge fluid may define a freezing point that is greater than the freezing point of hydrogen fuel. For example, in certain exemplary aspects, the purge fluid may be nitrogen. With such an exemplary aspect, in order to avoid the purge fluid from freezing when contacting the remaining volume of hydrogen fuel, providing the flow of purge fluid through the fuel delivery assembly at (514) may include at (516) providing the flow of purge fluid through the fuel delivery assembly after a boil-off time period from terminating the flow of hydrogen fuel from the fuel tank to the engine through the fuel delivery assembly at (504). The boil-off time period may be at least about two minutes and up to about two hours. In such a manner, it will be appreciated that providing the flow of purge fluid to the fuel delivery assembly after the boil-off time period at (516) may include at (518) providing the flow of purge fluid through the fuel delivery assembly after the remaining volume of hydrogen fuel in the fuel delivery assembly has increased to a temperature greater than a freezing temperature of the purge fluid. The method 500 may utilize one or more sensors to sense data indicative of a temperature of the remaining volume of hydrogen gas to determine whether or not the remaining volume of hydrogen fuel in the fuel delivery assembly has increased to a temperature greater than a freezing temperature of the purge fluid, and may make control decisions based on the same.

Referring still to FIG. 12, in other exemplary aspects of the method 500, other suitable means may additionally or alternatively be provided for evacuating the remaining volume of hydrogen fuel from the fuel delivery assembly at (510). For example, in certain exemplary aspects, evacuating the remaining volume of hydrogen fuel from the fuel delivery assembly at (510) may include at (520) operating the engine to combust at least a portion of the remaining volume of hydrogen fuel in the fuel delivery assembly. For example, operating the engine to combust at least a portion of the remaining volume of the hydrogen fuel in the fuel delivery assembly at (520) may include operating the engine to combust at least 20% of the remaining volume of hydrogen fuel, such as at least 30%, such as at least 40%, such as a at least 50%, such as a at least 60%, such as at least 70%, such as at least 80% of the remaining volume of the hydrogen fuel.

Additional or alternatively, evacuating the remaining volume of the hydrogen fuel from the fuel delivery assembly at (510) may include at (522) venting to atmosphere at least a portion of the remaining volume of the hydrogen fuel in the fuel delivery assembly, at (524) recapturing at least a portion of the remaining volume of hydrogen fuel and fuel delivery assembly, or both.

The portion of the remaining volume of hydrogen fuel in the fuel delivery assembly vented, e.g., to atmosphere at (522) may include at least about 20% of the remaining volume of hydrogen fuel, such as at least 30%, such as at least 40%, such as a at least 50%, such as a at least 60%, such as at least 70%, such as at least 80%, such as at least 90% of the remaining volume of the hydrogen fuel. Additionally or alternatively, the portion of the remaining volume of hydrogen fuel in the fuel delivery assembly recaptured at (524) may include at least about 20% of the remaining volume of hydrogen fuel, such as at least 30%, such as at least 40%, such as a at least 50%, such as a at least 60%, such as at least 70%, such as at least 80%, such as at least 90% of the remaining volume of the hydrogen fuel.

It will be appreciated, however, that in other exemplary aspects of the method 500 of FIG. 12, the method may include one or more additional or alternative steps to ensure the hydrogen fuel within the fuel delivery assembly may be removed without, e.g., freezing the fluid in the fuel delivery assembly.

Figure 13:
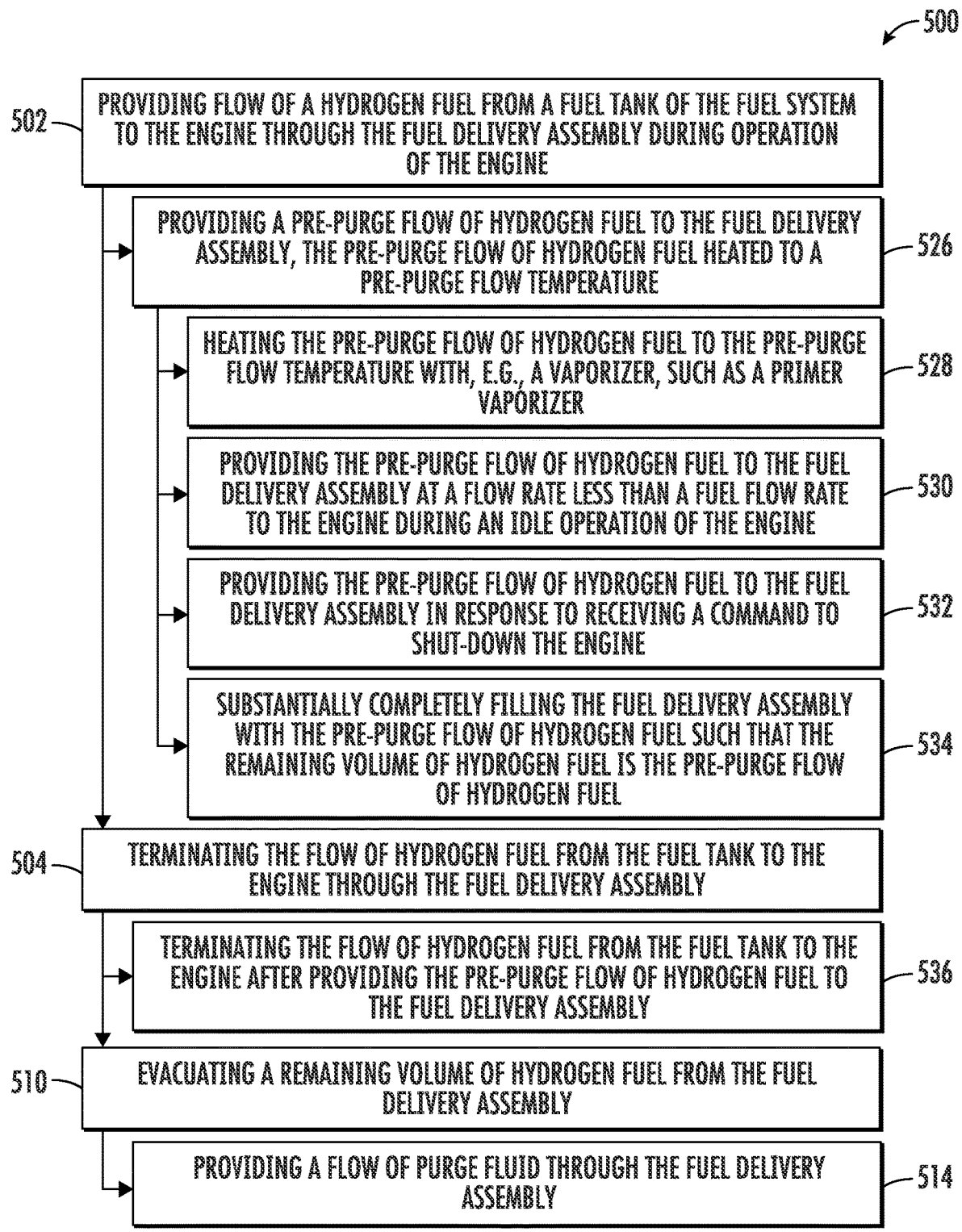
FIG. 13 is a flow diagram of a method for operating a fuel system in accordance with yet another exemplary aspect of the present disclosure.

For example, referring now to FIG. 13, a flow diagram of another exemplary aspect of the method 500 of FIG. 12 is provided. The exemplary aspect of FIG. 13 may be similar to the exemplary aspect of FIG. 12. For example, the exemplary aspect of the method 500 of FIG. 13 generally includes at (502) providing a flow of a hydrogen fuel from a fuel tank of the fuel system to the engine through the fuel delivery assembly during operation of the engine; at (504) terminating the flow of hydrogen fuel from the fuel tank to the engine through the fuel delivery assembly; and at (510) evacuating a remaining volume of hydrogen fuel from the fuel delivery assembly.

However, it will be appreciated that for the exemplary aspect of FIG. 13, providing the flow of hydrogen fuel from the fuel tank of the fuel system to the engine at (502) includes at (526) providing a pre-purge flow of hydrogen fuel to the fuel delivery assembly, the pre-purge flow of hydrogen fuel heated to a pre-purge flow temperature. In such a manner, it will be appreciated that providing the pre-purge flow of hydrogen fuel to the fuel delivery assembly at (526) includes at (528) heating the pre-purge flow of hydrogen fuel to the pre-purge flow temperature with, e.g., a vaporizer, such as a primer vaporizer. In such a manner, the method 500 may provide the pre-purge flow of hydrogen fuel relatively slowly so as to allow the pre-purge flow of hydrogen fuel to be sufficiently heated at (528). For example, in certain exemplary aspects, providing the pre-purge flow of hydrogen fuel to the fuel delivery assembly at (526) includes at (530) providing the pre-purge flow of hydrogen fuel to the fuel delivery assembly at a flow rate less than a fuel flowrate to the engine during idle operations of the engine, such as at a rate equal to between 5% and 90% of the fuel flowrate to the engine during idle operations of the engine.

Further, it will be appreciated that providing the pre-purge flow of hydrogen fuel to the fuel delivery assembly at (526) may occur as a first step in shutting down the engine. In such a manner, it will be appreciated that providing the pre-purge flow of hydrogen fuel to the fuel delivery assembly at (526) includes at (532) providing the pre-purge flow of hydrogen fuel to the fuel delivery assembly in response to receiving a command to shut-down the engine. In addition, providing the pre-purge flow of hydrogen fuel to the fuel delivery assembly at (526) may include at (534) substantially completely filling the fuel delivery assembly with the pre-purge flow of hydrogen fuel such that the remaining volume of hydrogen fuel is the pre-purge flow of hydrogen fuel.

Referring still to the exemplary aspect of the method 500 of FIG. 13, it will further be appreciated that terminating the flow of hydrogen fuel from the fuel tank to the engine at (504) includes at (536) terminating the flow of hydrogen fuel from the fuel tank to the engine after providing the pre-purge flow of hydrogen fuel to the fuel delivery assembly.

Additionally, for the exemplary aspect of the method 500 of FIG. 13, evacuating the remaining volume of hydrogen fuel from the fuel delivery assembly at (510) includes at (514) providing a flow of purge fluid through the fuel delivery assembly. In certain exemplary aspects, the purge fluid defines a freezing point temperature less than the pre-purge flow temperature. For example, in certain exemplary aspects, the purge fluid defines a boiling point temperature less than the pre-purge flow temperature. In such a manner, the method 500 may pre-purge the fuel delivery assembly with heated hydrogen fuel, allowing the fuel delivery assembly and the fluid therein to heat up to a temperature that will not liquify and/or freeze a subsequently provided purge fluid.

Operating a fuel system in accordance with one or more of the exemplary aspects of the method 500 described above may ensure that a minimum amount of hydrogen fuel remains in the fuel delivery assembly following operation of the engine. Such may prevent hydrogen fuel from seeping through the fuel delivery assembly during non-operation periods of the engine, potentially preventing hydrogen fuel from accumulating in undesirable locations within the engine, or elsewhere.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A fuel system for a vehicle having an engine, the fuel system comprising: a fuel tank for holding a hydrogen fuel in a liquid phase; a fuel delivery assembly extending from the fuel tank to the engine for providing the hydrogen fuel from the fuel tank to the engine; a vaporizer in communication with the fuel delivery assembly for heating the hydrogen fuel in the liquid phase to a gaseous phase, to a supercritical phase, or both; and a high pressure pump in fluid communication with the fuel delivery assembly at a location downstream of the vaporizer for inducing a flow of the hydrogen fuel through the fuel delivery assembly to the engine.

The fuel system of one or more of these clauses wherein the vehicle is an aircraft having a fuselage and a wing, wherein the fuel tank is positioned at least partially within the fuselage, the wing, or both, and wherein the vaporizer is also positioned at least partially within the fuselage, the wing, or both.

The fuel system of one or more of these clauses wherein the vaporizer is a primer vaporizer, and wherein the fuel system further includes a main vaporizer in communication with the fuel delivery assembly for heating the hydrogen fuel flowing through the fuel delivery assembly.

The fuel system of one or more of these clauses wherein the engine includes a heat source, and wherein the main vaporizer is in thermal communication with the heat source of the engine.

The fuel system of one or more of these clauses wherein the primer vaporizer includes or is in thermal communication with a heat source external to the engine.

The fuel system of one or more of these clauses further comprising: a makeup vaporizer in communication with the fuel delivery assembly for heating the hydrogen fuel flowing through the fuel delivery assembly, wherein the makeup vaporizer includes or is in thermal communication with a heat source external to the engine.

The fuel system of one or more of these clauses wherein the vehicle is an aircraft having a fuselage and a wing, wherein the fuel tank is positioned at least partially within the fuselage, the wing, or both, wherein the primer vaporizer is also positioned at least partially within the fuselage, the wing, or both, and wherein the main vaporizer and the makeup vaporizer are each positioned external to the fuselage and the wing of the aircraft.

The fuel system of one or more of these clauses wherein the vehicle is an aircraft having a fuselage and a wing, wherein the fuel tank is positioned at least partially within the fuselage, the wing, or both, wherein the primer vaporizer is also positioned at least partially within the fuselage, the wing, or both, and wherein the main vaporizer and the high-pressure pump are each positioned external to the fuselage and the wing of the aircraft.

The fuel system of one or more of these clauses wherein the main vaporizer is in communication with the fuel delivery assembly at a location downstream of the high-pressure pump.

The fuel system of one or more of these clauses wherein the main vaporizer is in communication with the fuel delivery assembly at a location upstream of the high-pressure pump.

The fuel system of one or more of these clauses further comprising: a fuel metering unit in flow communication with the fuel delivery assembly downstream of the vaporizer and the high-pressure pump.

The fuel system of one or more of these clauses wherein the fuel system is configured to provide the fuel metering unit with hydrogen fuel that is substantially completely in a gaseous phase or substantially completely in a supercritical phase.

The fuel system of one or more of these clauses wherein the vaporizer is a primer vaporizer, and wherein the fuel system further comprises: a main vaporizer in communication with the fuel delivery assembly for heating the hydrogen fuel flowing through the fuel delivery assembly; and a controller in operable communication with the primer vaporizer and the main vaporizer, wherein the controller is configured to operate the primer vaporizer when the engine is in a first operating condition and further is configured to operate the main vaporizer when the engine is in a second operating condition.

The fuel system of one or more of these clauses further comprising: a makeup vaporizer in communication with the fuel delivery assembly for heating the hydrogen fuel flowing through the fuel delivery assembly, wherein the controller is in operable communication with the makeup vaporizer, and wherein the controller is further configured to operate the makeup vaporizer when the engine is in a third operating condition.

The fuel system of one or more of these clauses wherein the first operating condition is a pre-start operating condition, wherein the third operating condition is a startup operating condition, and wherein the second operating condition is a thermally stable operating condition.

The fuel system of one or more of these clauses further comprising: a purge assembly in fluid communication with the fuel delivery assembly for providing a flow of purge fluid through the fuel delivery assembly during a shutdown of the engine or following a shutdown of the engine.

The fuel system of one or more of these clauses wherein the purge fluid is an oxygen-free gas.

The fuel system of one or more of these clauses wherein the vaporizer is configured to heat a flow of the hydrogen fuel from the fuel tank to convert the flow of the hydrogen fuel from a substantially liquid phase to a substantially gaseous phase or a substantially supercritical phase.

The fuel system of one or more of these clauses wherein the vaporizer includes or is in thermal communication with a heat source other than a waste heat source of the engine.

The fuel system of one or more of these clauses wherein the vaporizer utilizes a burner, a catalytic heater, a bleed airflow from an Auxiliary Power Unit, or an electric resistance heater.

The fuel system of one or more of these clauses further comprising: an accumulator in fluid communication with the fuel delivery assembly for receiving an overflow of hydrogen fuel from the fuel delivery assembly.

The fuel system of one or more of these clauses further comprising: a fuel metering unit in flow communication with the fuel delivery assembly downstream of the vaporizer and the high-pressure pump, wherein the accumulator is in fluid communication with the fuel delivery assembly at a location downstream of the high pressure pump and upstream of the fuel metering unit.

The fuel system of one or more of these clauses wherein the fuel delivery assembly includes a recirculation flowpath extending from a location downstream of the high pressure pump to a location upstream of the high pressure pump.

The fuel system of one or more of these clauses wherein the engine is a gas turbine engine, and wherein the vehicle is an aeronautical vehicle.

The fuel system of one or more of these clauses further comprising a low pressure pump in communication with the fuel delivery assembly at a location upstream of the vaporizer.

The fuel system of one or more of these clauses wherein the fuel tank is a pressurized fuel tank.

The fuel system of one or more of these clauses wherein the vaporizer is a dual function vaporizer configured to operate in a pre-start operating condition as a primer vaporizer and in a thermally stable operating condition as a main vaporizer.

The fuel system of one or more of these clauses wherein the vaporizer is a dual function vaporizer configured to operate in a pre-start operating condition as a primer vaporizer and in a startup operating condition as a makeup vaporizer.

A method of operating a fuel system for a vehicle having an engine, the method comprising: priming a fuel delivery assembly of the fuel system with a primer fluid defining a primer fluid phase change point; providing a flow of a hydrogen fuel from a fuel tank of the fuel system to the engine through the fuel delivery assembly, the hydrogen fuel within the fuel tank being at least partially in a liquid phase, and wherein providing the flow of the hydrogen fuel from the fuel tank comprises providing the flow of the hydrogen fuel from the fuel tank at a temperature equal to or above the primer fluid phase change point of the primer fluid.

The method of one or more of these clauses wherein the primer fluid phase change point is a primer fluid freezing point.

The method of one or more of these clauses wherein priming the fuel delivery assembly of the fuel system with the primer fluid comprises providing a flow of the primer fluid through the fuel delivery assembly, wherein the primer fluid freezing point is less than a freezing point of the hydrogen fuel.

The method of one or more of these clauses the primer fluid is helium.

The method of one or more of these clauses wherein priming the fuel delivery assembly of the fuel system with the primer fluid comprises pre-priming the fuel delivery assembly with a pre-priming fluid defining a pre-priming fluid freezing temperature, wherein the pre-priming fluid freezing temperature is within 150 degrees Celsius of a freezing temperature of the hydrogen fuel.

The method of one or more of these clauses wherein the pre-priming fluid freezing temperature is within 100 degrees Celsius of the boiling point of the hydrogen fuel.

The method of one or more of these clauses wherein the pre-priming fluid freezing temperature is within 75 degrees Celsius of the boiling point of the hydrogen fuel.

The method of one or more of these clauses wherein priming the fuel delivery assembly of the fuel system with the primer fluid further comprises providing the primer fluid gradually to the fuel delivery assembly minimize a freezing of the pre-priming fluid within the fuel delivery assembly.

The method of one or more of these clauses wherein the priming fluid is hydrogen fuel.

The method of one or more of these clauses wherein providing the primer fluid gradually to the fuel delivery assembly comprises providing the primer fluid to the fuel delivery assembly at a rate less than a fuel flow rate to the engine during an idle operation of the engine.

The method of one or more of these clauses wherein priming the fuel delivery assembly of the fuel system with the primer fluid comprises pre-priming the fuel delivery assembly with a pre-priming fluid, wherein the pre-priming fluid is nitrogen.

The method of one or more of these clauses wherein pre-priming the fuel delivery assembly with the pre-priming fluid comprises providing the pre-priming fluid from a pre-priming fluid source, wherein the pre-priming fluid source is a fluid tank, an on-board nitrogen generating system, or both.

The method of one or more of these clauses wherein the primer fluid is hydrogen fuel, and wherein priming the fuel delivery assembly of the fuel system comprises heating a flow of the hydrogen fuel from the fuel tank to convert the flow of hydrogen fuel from a liquid phase to a gaseous phase, and providing the flow of hydrogen fuel heated to the gaseous phase through the fuel delivery assembly as the primer fluid.

The method of one or more of these clauses wherein heating the flow of hydrogen fuel from the fuel tank comprises heating the flow of hydrogen fuel to a temperature above a freezing point of a gas in the fuel delivery assembly.

The method of one or more of these clauses wherein heating the flow of hydrogen fuel from the fuel tank comprises heating the flow of hydrogen fuel from the fuel tank using a vaporizer.

The method of one or more of these clauses wherein the primer fluid is hydrogen fuel, wherein priming the fuel delivery assembly of the fuel system comprises heating the flow of hydrogen fuel from the fuel tank using a primer vaporizer, and wherein providing the flow of the hydrogen fuel from the fuel tank to the engine comprises heating the flow of hydrogen fuel from the fuel tank using a main vaporizer.

The method of one or more of these clauses wherein heating the flow of hydrogen fuel from the fuel tank using the main vaporizer comprises providing heat to the main vaporizer from the engine.

The method of one or more of these clauses wherein heating the flow of hydrogen fuel from the fuel tank using the main vaporizer comprises providing heat to the main vaporizer from a heat source external to the engine.

The method of one or more of these clauses wherein priming the fuel delivery assembly of the fuel system comprises heating the flow of hydrogen fuel from the fuel tank using a primer vaporizer during a pre-start operating condition of the engine.

The method of one or more of these clauses wherein providing the flow of the hydrogen fuel from the fuel tank to the engine comprises providing the flow of hydrogen fuel from the fuel tank to the engine during an operating condition of the engine.

The method of one or more of these clauses wherein providing the flow of hydrogen fuel from the fuel tank to the engine during the operating condition of the engine comprises heating the flow of hydrogen fuel from the fuel tank using a makeup vaporizer during a startup operating condition of the engine, and heating the flow of hydrogen fuel from the fuel tank using a main vaporizer during a thermally stable operating condition of the engine.

The method of one or more of these clauses wherein providing the flow of hydrogen fuel from the fuel tank of the fuel system to the engine through the fuel delivery assembly comprises metering the flow of hydrogen fuel with a flow metering unit.

The method of one or more of these clauses wherein providing the flow of hydrogen fuel from the fuel tank of the fuel system to the engine through the fuel delivery assembly comprises providing the flow of hydrogen fuel through an outlet of the fuel tank substantially completely in a liquid phase, and providing the flow of hydrogen fuel to the flow metering unit substantially completely in a gaseous phase or substantially completely in a supercritical phase.

The method of one or more of these clauses further comprising: terminating the flow of hydrogen fuel from the fuel tank to the engine through the fuel delivery assembly; and providing a flow of purge fluid through the fuel delivery assembly subsequent to terminating the flow of hydrogen fuel from the fuel tank to the engine through the fuel delivery assembly.

The method of one or more of these clauses wherein terminating the flow of hydrogen fuel from the fuel tank to the engine comprises turning off one or more pumps in communication with the fuel delivery assembly.

The method of one or more of these clauses wherein the fuel tank provides hydrogen fuel to the fuel delivery assembly substantially completely in the liquid phase.

A method of operating a fuel system for a vehicle having an engine, the method comprising: providing a flow of a hydrogen fuel from a fuel tank of the fuel system to the engine through the fuel delivery assembly during operation of the engine; terminating the flow of hydrogen fuel from the fuel tank to the engine through the fuel delivery assembly; and evacuating a remaining volume of hydrogen fuel from the fuel delivery assembly.

The method of one or more of these clauses wherein evacuating the remaining volume of hydrogen fuel from the fuel delivery assembly comprises evacuating the remaining volume of hydrogen fuel from the fuel delivery assembly after terminating the flow of hydrogen fuel from the fuel tank to the engine through the fuel delivery assembly.

The method of one or more of these clauses wherein evacuating the remaining volume of hydrogen fuel from the fuel delivery assembly comprises providing a flow of purge fluid through the fuel delivery assembly.

The method of one or more of these clauses wherein the purge fluid defines a freezing point, and wherein the freezing point of the purge fluid is less than the freezing point of the hydrogen fuel.

The method of one or more of these clauses wherein the purge fluid is helium.

The method of one or more of these clauses wherein the purge fluid defines a freezing point, and wherein the freezing point of the purge fluid is greater than the boiling point of the hydrogen fuel.

The method of one or more of these clauses wherein the purge fluid is nitrogen.

The method of one or more of these clauses wherein providing the flow of purge fluid through the fuel delivery assembly comprises providing the flow of purge fluid through the fuel delivery assembly after a boil-off time period from terminating the flow of hydrogen fuel from the fuel tank to the engine through the fuel delivery assembly.

The method of one or more of these clauses wherein the boil-off time period is at least about two minutes and up to two hours.

The method of one or more of these clauses wherein providing the flow of purge fluid through the fuel delivery assembly after the boil-off time period from terminating the flow of hydrogen fuel from the fuel tank to the engine through the fuel delivery assembly comprises providing the flow of purge fluid through the fuel delivery assembly after determining the remaining volume of hydrogen fuel in the fuel delivery assembly has increased to a temperature greater than a freezing temperature of the purge fluid.

The method of one or more of these clauses wherein evacuating the remaining volume of hydrogen fuel from the fuel delivery assembly comprises operating the engine to combust a remaining volume of hydrogen fuel in the fuel delivery assembly.

The method of one or more of these clauses wherein evacuating the remaining volume of hydrogen fuel from the fuel delivery assembly comprises venting to atmosphere a remaining volume of hydrogen fuel in the fuel delivery assembly.

The method of one or more of these clauses wherein evacuating the remaining volume of hydrogen fuel from the fuel delivery assembly comprises recapturing at least a portion of a remaining volume of hydrogen fuel in the fuel delivery assembly.

The method of one or more of these clauses wherein terminating the flow of hydrogen fuel from the fuel tank to the engine comprises turning off one or more pumps in communication with the fuel delivery assembly.

The method of one or more of these clauses wherein providing the flow of hydrogen fuel from the fuel tank of the fuel system to the engine comprises providing a pre-purge flow of hydrogen fuel to the fuel delivery assembly, the pre-purge flow of hydrogen fuel heated to a pre-purge flow temperature.

The method of one or more of these clauses wherein providing the pre-purge flow of hydrogen fuel to the fuel delivery assembly comprises substantially completely filling the fuel delivery assembly with the pre-purge flow of hydrogen fuel such that the remaining volume of hydrogen fuel is the pre-purge flow of hydrogen fuel.

The method of one or more of these clauses wherein terminating the flow of hydrogen fuel from the fuel tank to the engine comprises terminating the flow of hydrogen fuel from the fuel tank to the engine after providing the pre-purge flow of hydrogen fuel to the fuel delivery assembly.

The method of one or more of these clauses wherein evacuating the remaining volume of hydrogen fuel comprises providing a flow of purge fluid through the fuel delivery assembly.

The method of one or more of these clauses wherein the purge fluid defines a freezing point temperature less than the pre-purge flow temperature.

The method of one or more of these clauses wherein the purge fluid defines a boiling point temperature less than the pre-purge flow temperature.

The method of one or more of these clauses wherein providing the pre-purge flow of hydrogen fuel to the fuel delivery assembly comprises heating the pre-purge flow of hydrogen fuel to the pre-purge flow temperature with a vaporizer.

The method of one or more of these clauses wherein providing the pre-purge flow of hydrogen fuel to the fuel delivery assembly comprises providing the pre-purge flow of hydrogen fuel to the fuel delivery assembly in response to receiving a command to shut-down the engine.

The method of one or more of these clauses wherein providing the pre-purge flow of hydrogen fuel to the fuel delivery assembly comprises providing the pre-purge flow of hydrogen fuel to the fuel delivery assembly at a flow rate less than a fuel flow rate to the engine during an idle operation of the engine.

A fuel system for a vehicle having an engine, the fuel system comprising: a fuel tank for holding a hydrogen fuel in a liquid phase; a fuel delivery assembly extending from the fuel tank to the engine for providing the hydrogen fuel from the fuel tank to the engine; a first vaporizer in communication with the fuel delivery assembly for heating the hydrogen fuel in the liquid phase to a gaseous phase, to a supercritical phase, or both when the engine is in a first operating condition; and a second vaporizer in communication with the fuel delivery assembly for heating the hydrogen fuel in the liquid phase to a gaseous phase, to a supercritical phase, or both when the engine is in a second operating condition.

The fuel system of one or more of these clauses wherein the first vaporizer is a primer vaporizer, and wherein the first operating condition is a pre-start operating condition.

The fuel system of one or more of these clauses wherein the second vaporizer is a main vaporizer, and wherein the second operating condition is a thermally stable operating condition.

The fuel system of one or more of these clauses wherein the second vaporizer is in thermal communication with a heat source of the engine.

The fuel system of one or more of these clauses further comprising: a third vaporizer in communication with the fuel delivery assembly for heating the hydrogen fuel in the liquid phase to a gaseous phase, to a supercritical phase, or both when the engine is in a third operating condition.

The fuel system of one or more of these clauses wherein the third vaporizer is a makeup vaporizer, and wherein the third operating condition is a startup operating condition.

The fuel system of one or more of these clauses wherein the first vaporizer is a primer vaporizer, wherein the first operating condition is a pre-start operating condition, wherein the second vaporizer is a main vaporizer, and wherein the second operating condition is a thermally stable operating condition.

A vehicle including the fuel system of one or more of these clauses.

A vehicle including a fuel system operated in accordance with the method of one or more of these clauses.

A fuel system comprising a controller, the controller including one or more processors and memory, the memory storing instructions that when executed cause fuel system to perform the operations of the method of one or more of these clauses.

The invention claimed is:

1. A fuel system for a vehicle having a gas turbine engine, the fuel system comprising:
   a fuel tank for holding a hydrogen fuel in a liquid phase;
   a fuel delivery assembly extending from the fuel tank to the engine for providing the hydrogen fuel from the fuel tank to the engine;
   a purge/prime assembly configured to provide a flow of primer fluid or pre-primer fluid to the fuel delivery assembly;
   a first vaporizer in communication with the fuel delivery assembly for heating the hydrogen fuel in the liquid phase to a gaseous phase, to a supercritical phase, or both when the engine is in a first operating condition; and
   a second vaporizer in communication with the fuel delivery assembly for heating the hydrogen fuel in the liquid phase to a gaseous phase, to a supercritical phase, or both when the engine is in a second operating condition, wherein
   the purge/prime assembly is fluidly coupled to the fuel delivery assembly downstream from the first vaporizer and upstream from the second vaporizer.

2. The fuel system of claim 1, wherein the first vaporizer is a primer vaporizer, and wherein the first operating condition is a pre-start operating condition.

3. The fuel system of claim 2, wherein the second vaporizer is a main vaporizer, and wherein the second operating condition is a thermally stable operating condition.

4. The fuel system of claim 3, wherein the second vaporizer is in thermal communication with a heat source of the engine.

5. The fuel system of claim 1, further comprising:
   a third vaporizer in communication with the fuel delivery assembly for heating the hydrogen fuel in the liquid phase to a gaseous phase, to a supercritical phase, or both when the engine is in a third operating condition.

6. The fuel system of claim 5, wherein the third vaporizer is a makeup vaporizer, and wherein the third operating condition is a startup operating condition.

7. The fuel system of claim 1, wherein the first vaporizer is a primer vaporizer, wherein the first operating condition is a pre-start operating condition, wherein the second vaporizer is a main vaporizer, and wherein the second operating condition is a thermally stable operating condition.

8. An engine for a vehicle, the vehicle comprising a fuel tank for holding a hydrogen fuel in a liquid phase, the engine comprising:
   a turbomachine comprising a compressor section, a combustion section, and a turbine section arranged in serial flow order, the combustion section comprising a plurality of fuel nozzles; and
   fuel system comprising:
      a fuel delivery assembly configured to extend from the fuel tank to the engine for providing the hydrogen fuel from the fuel tank to the plurality of fuel nozzles of the turbomachine of the engine;
      a purge/prime assembly configured to provide a flow of primer fluid or pre-primer fluid to the fuel delivery assembly;
      a first vaporizer in communication with the fuel delivery assembly for heating the hydrogen fuel in the liquid phase to a gaseous phase, to a supercritical phase, or both when the engine is in a first operating condition; and
      a second vaporizer in communication with the fuel delivery assembly for heating the hydrogen fuel in the liquid phase to a gaseous phase, to a supercritical phase, or both when the engine is in a second operating condition, wherein the purge/prime assembly is fluidly coupled to the fuel delivery assembly downstream from the first vaporizer and upstream from the second vaporizer.

9. The engine of claim 8, wherein the first vaporizer is a primer vaporizer, and wherein the first operating condition is a pre-start operating condition.

10. The engine of claim 9, wherein the second vaporizer is a main vaporizer, and wherein the second operating condition is a thermally stable operating condition.

11. The engine of claim 10, wherein the second vaporizer is in thermal communication with a heat source of the engine.

12. The engine of claim 8, further comprising:
a third vaporizer in communication with the fuel delivery assembly for heating the hydrogen fuel in the liquid phase to a gaseous phase, to a supercritical phase, or both when the engine is in a third operating condition.

13. The engine of claim 12, wherein the third vaporizer is a makeup vaporizer, and wherein the third operating condition is a startup operating condition.

14. The engine of claim 8, wherein the first vaporizer is a primer vaporizer, wherein the first operating condition is a pre-start operating condition, wherein the second vaporizer is a main vaporizer, and wherein the second operating condition is a thermally stable operating condition.

15. A method of operating a fuel system for a vehicle having a gas turbine engine, the method comprising:
priming a fuel delivery assembly of a fuel system with a primer fluid, through a purge/prime assembly;
providing a flow of hydrogen fuel from a fuel tank of the fuel system to the engine through the fuel delivery assembly;
heating the flow of hydrogen fuel from the fuel tank using a first vaporizer during a first operating condition of the engine; and
heating the flow of hydrogen fuel from the fuel tank using a second vaporizer during a second operating condition of the engine, wherein
the purge/prime assembly is fluidly coupled to the fuel delivery assembly downstream from the first vaporizer and upstream from the second vaporizer.

16. The method of claim 15, wherein the first vaporizer is a primer vaporizer and the first operating condition is a pre-start operating condition the engine.

17. The method of claim 15, wherein the second vaporizer is a makeup vaporizer and the second operating condition is a startup operating condition of the engine.

18. The method of claim 15, further comprising:
heating the flow of hydrogen fuel from the fuel tank using a third vaporizer during a third operating condition of the engine.

19. The method of claim 15, wherein third vaporizer is a main vaporizer and the third operating condition is a thermally stable operating condition of the engine.

20. The method of claim 15, wherein heating the flow of hydrogen fuel from the fuel tank using the second vaporizer during the second operating condition of the engine comprises providing heat to the second vaporizer from a heat source of the engine.

* * * * *